US012267837B2

(12) United States Patent
Yang et al.

(10) Patent No.: US 12,267,837 B2
(45) Date of Patent: Apr. 1, 2025

(54) MULTIPLEXING HIGH PRIORITY AND LOW PRIORITY UPLINK CONTROL INFORMATION ON A PHYSICAL UPLINK SHARED CHANNEL

(71) Applicant: QUALCOMM Incorporated, San Diego, CA (US)

(72) Inventors: Wei Yang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 598 days.

(21) Appl. No.: 17/534,871

(22) Filed: Nov. 24, 2021

(65) Prior Publication Data
US 2022/0167348 A1 May 26, 2022

Related U.S. Application Data

(60) Provisional application No. 63/187,248, filed on May 11, 2021, provisional application No. 63/118,549, filed on Nov. 25, 2020.

(51) Int. Cl.
*H04W 72/02* (2009.01)
*H04W 72/21* (2023.01)
*H04W 72/542* (2023.01)
*H04W 72/56* (2023.01)

(52) U.S. Cl.
CPC ........... *H04W 72/21* (2023.01); *H04W 72/02* (2013.01); *H04W 72/542* (2023.01); *H04W 72/56* (2023.01)

(58) Field of Classification Search
None
See application file for complete search history.

(56) References Cited

U.S. PATENT DOCUMENTS

| 2020/0314900 | A1 | 10/2020 | Hosseini et al. |
| 2021/0218451 | A1* | 7/2021 | Li .................... H04W 72/53 |
| 2022/0132537 | A1* | 4/2022 | Wang ................. H04L 5/0053 |

(Continued)

FOREIGN PATENT DOCUMENTS

| WO | WO-2020143428 A1 | 7/2020 |
| WO | WO-2020146247 A2 | 7/2020 |

OTHER PUBLICATIONS

International Search Report and Written Opinion—PCT/US2021/060826—ISA/EPO—Mar. 11, 2022 (2101049WO).

(Continued)

*Primary Examiner* — Kodzovi Acolatse
(74) *Attorney, Agent, or Firm* — Holland & Hart LLP

(57) ABSTRACT

Methods, systems, and devices for wireless communications are described. A user equipment (UE) may determine that a high priority uplink control information (UCI) message, a low priority UCI message, and an uplink shared channel message overlap. The UE may select a first set of resources on the physical uplink shared channel for the high priority UCI message then select a second set of resources on the physical uplink shared channel for the low priority UCI message. The second set of resources may be non-overlapping with the first set of resources. The UE may transmit the high priority UCI message on the first set of resources, the low priority UCI message on the second set of resources, and the uplink shared channel message on a third set of resources on the physical uplink shared channel.

26 Claims, 19 Drawing Sheets

(56) References Cited

U.S. PATENT DOCUMENTS

| | | | |
|---|---|---|---|
| 2023/0189273 A1* | 6/2023 | Fu | H04L 5/0064 |
| | | | 370/329 |
| 2023/0345471 A1* | 10/2023 | Seok | H04L 1/1854 |

OTHER PUBLICATIONS

European Search Report—EP24172441—Search Authority—The Hague—Jul. 23, 2024 (2101049EPD1).

* cited by examiner

MULTIPLEXING HIGH PRIORITY AND LOW PRIORITY UPLINK CONTROL INFORMATION ON A PHYSICAL UPLINK SHARED CHANNEL

CROSS REFERENCE

The present Application for Patent claims the benefit of U.S. Provisional Patent Application No. 63/118,549 by Yang et al., entitled "MULTIPLEXING HIGH PRIORITY AND LOW PRIORITY UPLINK CONTROL INFORMATION ON A PHYSICAL UPLINK SHARED CHANNEL," filed Nov. 25, 2020, and U.S. Provisional Patent Application No. 63/187,248 by Yang et al., entitled "MULTIPLEXING HIGH PRIORITY AND LOW PRIORITY UPLINK CONTROL INFORMATION ON A PHYSICAL UPLINK SHARED CHANNEL," filed May 11, 2021, assigned to the assignee hereof, and expressly incorporated by reference herein.

FIELD OF TECHNOLOGY

The following relates to wireless communications, including multiplexing high priority and low priority uplink control information on a physical uplink shared channel.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may multiplex different uplink transmissions together on an uplink channel. If the UE is configured to send transmissions with different priorities, the UE may drop transmissions with lower priority to ensure reliable transmission of higher priority information. However, this may prevent the UE from sending the lower priority information, increasing latency. Techniques for multiplexing on an uplink channel may be deficient.

SUMMARY

The described techniques relate to improved methods, systems, devices, and apparatuses that support multiplexing high priority and low priority uplink control information (UCI) on a physical uplink shared channel (PUSCH). A user equipment (UE) may be scheduled to transmit multiple messages to a base station at a same or overlapping time on a radio frequency spectrum band. For example, the UE may receive downlink control information (DCI) scheduling the UE to transmit a high priority UCI transmission, a low priority UCI transmission, and a PUSCH data transmission. Wireless communications systems described herein support techniques to multiplex high priority and low priority UCI transmissions on an uplink shared channel.

Multiplexing high priority and low priority UCI transmissions on a PUSCH may be based on payload sizes of the UCI transmissions. For example, if a payload size for a UCI transmission is less than or equal to a threshold bit size, the UCI transmission may puncture the uplink shared channel. In some cases, when the payload size for the UCI transmission is less than or equal to the threshold bit size, the UE may assume the payload size is equal to the threshold bit size to select the resources, even if the actual payload size is smaller. If the payload size is greater than the threshold bit size, the uplink shared channel may be rate matched around the UCI transmission. The threshold bit size may be, for example, two bits, where any UCI transmission which is two bits or smaller may puncture the uplink shared channel, and the uplink shared channel may be rate matched around UCI transmissions which are greater than two bits. The UE may first map the high priority UCI transmission to a first set of resources on the uplink shared channel. The UE may then map the low priority UCI transmission to a second set of resources on the uplink shared channel after mapping the high priority UCI transmission. In some examples, the low priority UCI transmission may not occupy any resources that are used or reserved for the high priority UCI transmission. The UE may then select resources for the uplink shared channel message after selecting resources for the high priority and low priority UCI messages.

A method for wireless communications at a UE is described. The method may include determining that a first UCI message with a first priority, a second UCI message with a second priority, and an uplink shared channel message overlap, where the first priority is higher than the second priority, selecting a first set of resources on the physical uplink shared channel for the first UCI message based on the first priority, selecting a second set of resources on the physical uplink shared channel for the second UCI message based on the second priority, where the second set of resources is non-overlapping with the first set of resources, and transmitting the first UCI message on the first set of resources and the second UCI message on the second set of resources on the physical uplink shared channel.

An apparatus for wireless communications at a UE is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to determine that a first UCI message with a first priority, a second UCI message with a second priority, and an uplink shared channel message overlap, where the first priority is higher than the second priority, select a first set of resources on the physical uplink shared channel for the first UCI message based on the first priority, select a second set of resources on the physical uplink shared channel for the second UCI message based on the second priority, where the second set of resources is non-overlapping with the first set of resources, and transmit the first UCI message on the first set of resources and the second UCI message on the second set of resources on the physical uplink shared channel.

Another apparatus for wireless communications at a UE is described. The apparatus may include means for determining that a first UCI message with a first priority, a second UCI message with a second priority, and an uplink shared channel message overlap, where the first priority is higher than the second priority, means for selecting a first set of resources on the physical uplink shared channel for the first UCI message based on the first priority, means for selecting a second set of resources on the physical uplink shared channel for the second UCI message based on the second priority, where the second set of resources is non-overlapping with the first set of resources, and means for transmitting the first UCI message on the first set of resources and the second UCI message on the second set of resources on the physical uplink shared channel.

A non-transitory computer-readable medium storing code for wireless communications at a UE is described. The code may include instructions executable by a processor to determine that a first UCI message with a first priority, a second UCI message with a second priority, and an uplink shared channel message overlap, where the first priority is higher than the second priority, select a first set of resources on the physical uplink shared channel for the first UCI message based on the first priority, select a second set of resources on the physical uplink shared channel for the second UCI message based on the second priority, where the second set of resources is non-overlapping with the first set of resources, and transmit the first UCI message on the first set of resources and the second UCI message on the second set of resources on the physical uplink shared channel.

Some examples of the method, apparatuses, and non-transitory computer-readable medium described herein may further include operations, features, means, or instructions for determining that a first payload size of the first UCI message and a second payload size of the second UCI message may be each equal to or below a bit size threshold, where selecting the first set of resources and selecting the second set of resources includes reserving the first set of resources for the first UCI message and the second set of resources for the second UCI message based on the first payload size and the second payload size being equal to or below the bit size threshold.

In some examples of the method, apparatuses, and non-transitory computer-readable medium described herein, reserving the first set of resources and the second set of resources may include operations, features, means, or instructions for reserving the first set of resources and the second set of resources based on an assumption that the first payload and the second payload each include a number of bits equal to the bit size threshold.

In some examples of the method, apparatuses, and non-transitory computer-readable medium described herein, selecting the first set of resources and selecting the second set of resources may include operations, features, means, or instructions for puncturing the physical uplink shared channel with the first UCI message on the first set of resources, where the first UCI message occupies a fourth set of resources contained in the first set of resources and puncturing the physical uplink shared channel with the second UCI on the second set of resources, where the second UCI occupies a fifth set of resources contained in the second set of resources.

In some examples of the method, apparatuses, and non-transitory computer-readable medium described herein, the fourth set of resources may be determined based on a first actual payload size of the first UCI message, and the fifth set of resources may be determined based on a second actual payload size of the second UCI message.

In some examples of the method, apparatuses, and non-transitory computer-readable medium described herein, the bit size threshold may be two bits.

In some examples of the method, apparatuses, and non-transitory computer-readable medium described herein, the first set of resources or the second set of resources.

Some examples of the method, apparatuses, and non-transitory computer-readable medium described herein may further include operations, features, means, or instructions for determining that a first payload size of the first UCI message may be equal to or below a bit size threshold, where selecting the first set of resources includes reserving the first set of resources for the first UCI message based on the first payload size being equal to or below the bit size threshold and determining that a second payload size of the second UCI message may be above the bit size threshold.

In some examples of the method, apparatuses, and non-transitory computer-readable medium described herein, reserving the first set of resources may include operations, features, means, or instructions for reserving the first set of resources based on an assumption that the first payload includes a number of bits equal to the bit size threshold.

Some examples of the method, apparatuses, and non-transitory computer-readable medium described herein may further include operations, features, means, or instructions for selecting the third set of resources, where the third set of resources may be non-overlapping with the second set of resources and overlapping with the first set of resources.

In some examples of the method, apparatuses, and non-transitory computer-readable medium described herein, selecting the first set of resources may include operations, features, means, or instructions for puncturing the physical uplink shared channel with the first UCI message, where the first UCI message occupies a fourth set of resources contained by the first set of resources, and where the fourth set of resources may be determined based on an actual payload size of the first UCI message.

In some examples of the method, apparatuses, and non-transitory computer-readable medium described herein, rate matching the uplink shared channel message around the second set of resources based on selecting the second set of resources.

Some examples of the method, apparatuses, and non-transitory computer-readable medium described herein may further include operations, features, means, or instructions for determining that a first payload size of the first UCI message may be above the bit size threshold and determining that a second payload size of the second UCI message may be equal to or below a bit size threshold, where selecting the second set of resources includes reserving the second set of resources for the second UCI message based on the second payload size being equal to or below the bit size threshold.

In some examples of the method, apparatuses, and non-transitory computer-readable medium described herein, reserving the second set of resources may include operations, features, means, or instructions for reserving the second set of resources based on an assumption that the second payload includes a number of bits equal to the bit size threshold.

Some examples of the method, apparatuses, and non-transitory computer-readable medium described herein may further include operations, features, means, or instructions for selecting the third set of resources, where the third set of resources may be non-overlapping with the first set of resources and overlapping with the second set of resources.

In some examples of the method, apparatuses, and non-transitory computer-readable medium described herein, selecting the second set of resources may include operations, features, means, or instructions for puncturing the physical uplink shared channel with the second UCI message, where the second UCI message occupies a fourth set of resources contained by the second set of resources, and where the fourth set of resources may be determined based on an actual payload size of the second UCI message.

In some examples of the method, apparatuses, and non-transitory computer-readable medium described herein, rate matching the uplink shared channel message around the first set of resources based on selecting the first set of resources.

Some examples of the method, apparatuses, and non-transitory computer-readable medium described herein may further include operations, features, means, or instructions for determining that a first payload size of the first UCI message and a second payload size of the second UCI message may be each above a bit size threshold.

Some examples of the method, apparatuses, and non-transitory computer-readable medium described herein may further include operations, features, means, or instructions for selecting the third set of resources, where the third set of resources may be non-overlapping with the first set of resources and the second set of resources.

In some examples of the method, apparatuses, and non-transitory computer-readable medium described herein, rate matching the uplink shared channel message around the first set of resources and the second set of resources based on selecting the first set of resources and the second set of resources.

Some examples of the method, apparatuses, and non-transitory computer-readable medium described herein may further include operations, features, means, or instructions for determining that a channel state information (CSI) transmission overlaps one or more of: the first UCI message, the second UCI message, or the uplink shared channel message.

Some examples of the method, apparatuses, and non-transitory computer-readable medium described herein may further include operations, features, means, or instructions for determining a quantity of types of UCI which overlap the uplink shared channel message exceeds a threshold and dropping at least a portion of the CSI transmission, a portion of the first UCI, or a portion of the second UCI message, or any combination thereof, based on the quantity exceeding the threshold.

In some examples of the method, apparatuses, and non-transitory computer-readable medium described herein, the CSI transmission is an aperiodic CSI transmission associated with the physical uplink shared channel, a semi-persistent CSI transmission associated with the physical uplink shared channel, a semi-persistent CSI transmission associated with a physical uplink control channel, or a periodic CSI transmission associated with the physical uplink control channel.

In some examples of the method, apparatuses, and non-transitory computer-readable medium described herein, the threshold is two types of UCI or three types of UCI.

Some examples of the method, apparatuses, and non-transitory computer-readable medium described herein may further include operations, features, means, or instructions for determining a quantity of types of UCI which overlap the uplink shared channel message exceeds a threshold and dropping at least a portion of the CSI transmission, a portion of the first UCI, or a portion of the second UCI message, or any combination thereof, based on the quantity exceeding the threshold.

Some examples of the method, apparatuses, and non-transitory computer-readable medium described herein may further include operations, features, means, or instructions for receiving, from a base station, an indication of the threshold via DCI, a medium access control (MAC) control element (CE), or radio resource control (RRC) signaling.

Some examples of the method, apparatuses, and non-transitory computer-readable medium described herein may further include operations, features, means, or instructions for determining that a first portion of the CSI transmission may have a lower priority than the uplink shared channel message and dropping the first portion of the CSI transmission.

Some examples of the method, apparatuses, and non-transitory computer-readable medium described herein may further include operations, features, means, or instructions for determining a fourth set of resources on the physical uplink shared channel for a second portion of the CSI transmission having a same or higher priority than the uplink shared channel message and transmitting the second portion of the CSI on the fourth set of resources.

Some examples of the method, apparatuses, and non-transitory computer-readable medium described herein may further include operations, features, means, or instructions for determining the CSI transmission has a higher priority than the second UCI and a lower priority than the first UCI, dropping the second UCI, and transmitting the first UCI on the first set of resources and the CSI transmission on a fourth set of resources.

Some examples of the method, apparatuses, and non-transitory computer-readable medium described herein may further include operations, features, means, or instructions for determining a fourth set of resources on the physical uplink shared channel for at least a first portion of the CSI transmission and transmitting the first portion of the CSI transmission on the fourth set of resources.

Some examples of the method, apparatuses, and non-transitory computer-readable medium described herein may further include operations, features, means, or instructions for rate matching the first portion of the CSI transmission around the first set of resources and the second set of resources.

Some examples of the method, apparatuses, and non-transitory computer-readable medium described herein may further include operations, features, means, or instructions for rate matching the first portion of the CSI transmission around the first set of resources and the second set of resources and puncturing at least a portion of a fifth set of resources for a second portion of the CSI transmission with one or more of: the first set of resources or the second set of resources.

In some examples of the method, apparatuses, and non-transitory computer-readable medium described herein, one or more of the first UCI message or the second UCI message includes acknowledgment feedback.

A method for wireless communications at a base station is described. The method may include monitoring a physical uplink shared channel for an uplink shared channel message, a first UCI message with a first priority, a second UCI message with a second priority from a UE, where the first priority is higher than the second priority, identifying a first set of resources on the physical uplink shared channel for the first UCI message, identifying a second set of resources on the physical uplink shared channel for the second UCI message, where the first set of resources is non-overlapping with the second set of resources, and decoding the first UCI message on the first set of resources and the second UCI message on the second set of resources on the physical uplink shared channel.

An apparatus for wireless communications at a base station is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to monitor a physical uplink shared channel for an uplink shared channel message, a first UCI message with a first priority, a second UCI message with a second priority from a UE, where the first priority is higher than the second priority, identify a first set of resources on the physical uplink shared channel for the first UCI message, identify a second set of resources on the physical uplink shared channel for the second UCI message, where the first set of resources is non-overlapping with the second set of resources, and decode the first UCI message on the first set of resources and the second UCI message on the second set of resources on the physical uplink shared channel.

Another apparatus for wireless communications at a base station is described. The apparatus may include means for monitoring a physical uplink shared channel for an uplink shared channel message, a first UCI message with a first priority, a second UCI message with a second priority from a UE, where the first priority is higher than the second priority, means for identifying a first set of resources on the physical uplink shared channel for the first UCI message, means for identifying a second set of resources on the physical uplink shared channel for the second UCI message, where the first set of resources is non-overlapping with the second set of resources, and means for decoding the first UCI message on the first set of resources and the second UCI message on the second set of resources on the physical uplink shared channel.

A non-transitory computer-readable medium storing code for wireless communications at a base station is described. The code may include instructions executable by a processor to monitor a physical uplink shared channel for an uplink shared channel message, a first UCI message with a first priority, a second UCI message with a second priority from a UE, where the first priority is higher than the second priority, identify a first set of resources on the physical uplink shared channel for the first UCI message, identify a second set of resources on the physical uplink shared channel for the second UCI message, where the first set of resources is non-overlapping with the second set of resources, and decode the first UCI message on the first set of resources and the second UCI message on the second set of resources on the physical uplink shared channel.

Some examples of the method, apparatuses, and non-transitory computer-readable medium described herein may further include operations, features, means, or instructions for determining that a first payload size of the first UCI message and a second payload size of the second UCI message may be each equal to or below a bit size threshold, where the first set of resources and the second set of resources may be reserved based on the first payload size and the second payload size being equal to or below the bit size threshold.

In some examples of the method, apparatuses, and non-transitory computer-readable medium described herein, the first set of resources and the second set of resources may be reserved based on an assumption that the first payload and the second payload each include a number of bits equal to the bit size threshold.

Some examples of the method, apparatuses, and non-transitory computer-readable medium described herein may further include operations, features, means, or instructions for determining the physical uplink shared channel may be punctured by the first UCI message on the first set of resources, where the first UCI message occupies a fourth set of resources contained in the first set of resources and determining the physical uplink shared channel may be punctured by the second UCI on the second set of resources, where the second UCI occupies a fifth set of resources contained in the second set of resources.

In some examples of the method, apparatuses, and non-transitory computer-readable medium described herein, the fourth set of resources may be based on a first actual payload size of the first UCI message, and the fifth set of resources may be based on a second actual payload size of the second UCI message.

Some examples of the method, apparatuses, and non-transitory computer-readable medium described herein may further include operations, features, means, or instructions for determining that a first payload size of the first UCI message may be equal to or below a bit size threshold, where the first set of resources may be reserved for the first UCI message based on the first payload size being equal to or below the bit size threshold and determining that a second payload size of the second UCI message may be above the bit size threshold.

In some examples of the method, apparatuses, and non-transitory computer-readable medium described herein, the first set of resources may be reserved based on an assumption that the first payload includes a number of bits equal to the bit size threshold.

In some examples of the method, apparatuses, and non-transitory computer-readable medium described herein, the third set of resources may be non-overlapping with the second set of resources and overlapping with the first set of resources.

Some examples of the method, apparatuses, and non-transitory computer-readable medium described herein may further include operations, features, means, or instructions for determining the physical uplink shared channel may be punctured by the first UCI message, where the first UCI message occupies a fourth set of resources contained by the first set of resources based on an actual payload size of the first UCI message.

In some examples of the method, apparatuses, and non-transitory computer-readable medium described herein, the uplink shared channel message may be rate matched around the second set of resources.

Some examples of the method, apparatuses, and non-transitory computer-readable medium described herein may further include operations, features, means, or instructions for determining that a first payload size of the first UCI message may be above the bit size threshold and determining that a second payload size of the second UCI message may be equal to or below a bit size threshold where the second set of resources may be reserved for the second UCI message based on the second payload size being equal to or below the bit size threshold.

In some examples of the method, apparatuses, and non-transitory computer-readable medium described herein, the second set of resources may be reserved based on an assumption that the second payload includes a number of bits equal to the bit size threshold.

In some examples of the method, apparatuses, and non-transitory computer-readable medium described herein, the third set of resources may be non-overlapping with the first set of resources and overlapping with the second set of resources.

Some examples of the method, apparatuses, and non-transitory computer-readable medium described herein may further include operations, features, means, or instructions for determining the physical uplink shared channel may be punctured by the second UCI message, where the second UCI message occupies a fourth set of resources contained by the second set of resources based on an actual payload size of the second UCI message.

In some examples of the method, apparatuses, and non-transitory computer-readable medium described herein, the uplink shared channel message may be rate matched around the first set of resources.

Some examples of the method, apparatuses, and non-transitory computer-readable medium described herein may further include operations, features, means, or instructions for determining that a first payload size of the first UCI message and a second payload size of the second UCI message may be each above a bit size threshold, where the third set of resources may be non-overlapping with the first set of resources and the second set of resources.

In some examples of the method, apparatuses, and non-transitory computer-readable medium described herein, the uplink shared channel message may be rate matched around the first set of resources and the second set of resources.

Some examples of the method, apparatuses, and non-transitory computer-readable medium described herein may further include operations, features, means, or instructions for determining that a CSI transmission overlaps one or more of: the first UCI message, the second UCI message, or the uplink shared channel message.

Some examples of the method, apparatuses, and non-transitory computer-readable medium described herein may further include operations, features, means, or instructions for determining a quantity of types of UCI which overlap the uplink shared channel message exceeds a threshold and determining that at least a portion of the CSI transmission, a portion of the first UCI, or a portion of the second UCI message, or any combination thereof, is dropped by the UE based on the quantity exceeding the threshold.

Some examples of the method, apparatuses, and non-transitory computer-readable medium described herein may further include operations, features, means, or instructions for transmitting, to the UE, an indication of the threshold via DCI, a MAC CE, or RRC signaling.

Some examples of the method, apparatuses, and non-transitory computer-readable medium described herein may further include operations, features, means, or instructions for determining that a first portion of the CSI transmission may have a lower priority than the uplink shared channel message, where the first portion of the CSI transmission may be dropped by the UE.

Some examples of the method, apparatuses, and non-transitory computer-readable medium described herein may further include operations, features, means, or instructions for determining a fourth set of resources on the physical uplink shared channel for a second portion of the CSI transmission having a same or higher priority than the uplink shared channel message and receiving the second portion of the CSI transmission with the higher priority on the fourth set of resources.

Some examples of the method, apparatuses, and non-transitory computer-readable medium described herein may further include operations, features, means, or instructions for determining a fourth set of resources on the physical uplink shared channel for at least a first portion of the CSI transmission and receiving the first portion of the CSI transmission on the fourth set of resources.

In some examples of the method, apparatuses, and non-transitory computer-readable medium described herein, the first portion of the CSI transmission may be rate matched around the first set of resources and the second set of resources.

In some examples of the method, apparatuses, and non-transitory computer-readable medium described herein, the first portion of the CSI transmission may be rate matched around the first set of resources and the second set of resources and one or more of the first set of resources or the second set of resources puncture at least a portion of a fifth set of resources for a second portion of the CSI transmission.

In some examples of the method, apparatuses, and non-transitory computer-readable medium described herein, one or more of the first UCI message or the second UCI message include acknowledgment feedback.

DETAILED DESCRIPTION

Figure 1:
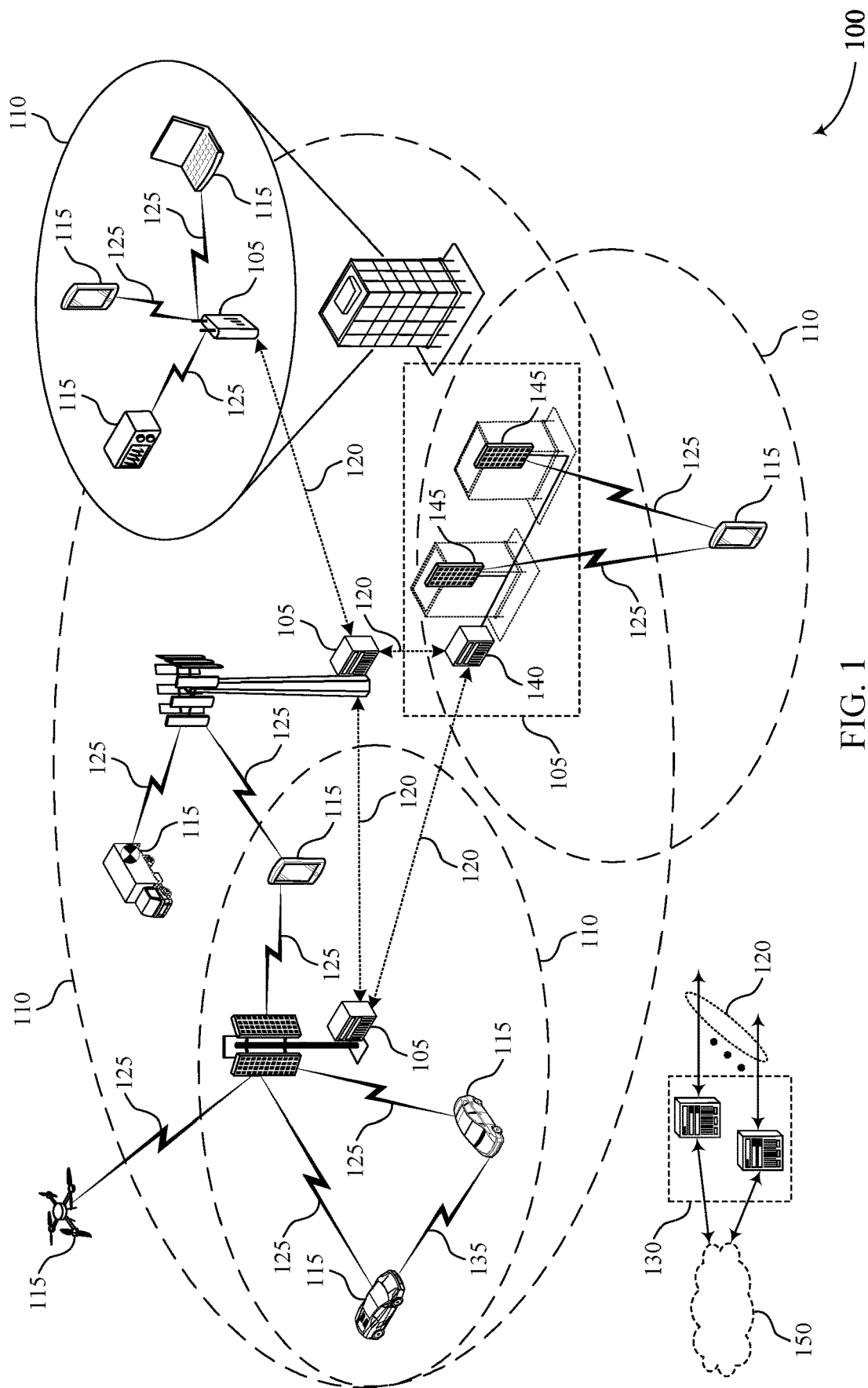
FIG. 1 illustrates an example of a wireless communications system that supports multiplexing high priority and low priority uplink control information (UCI) on a physical uplink shared channel (PUSCH) in accordance with aspects of the present disclosure.

A user equipment (UE) may be scheduled to transmit multiple messages to a base station at a same or overlapping time on a radio frequency spectrum band. For example, the UE may receive downlink control information (DCI) scheduling the UE to transmit a high priority uplink control information (UCI) transmission, a low priority UCI transmission, and an uplink shared channel data transmission. In some wireless communications systems, a UE may drop low priority transmissions that collide with higher priority transmissions. However, this may result in significant latency for the lower priority transmission, as the UE may wait to transmit the lower priority message at a later point (e.g., a later transmission opportunity or after receiving another grant).

Wireless communications systems described herein support techniques to multiplex high priority and low priority UCI transmissions on an uplink shared channel. The UE may multiplex hybrid acknowledgment repeat request (HARQ) acknowledgment (ACK) feedback or channel state information (CSI), or both, on the uplink shared channel. The UE may select resources to provide better protection for the high priority UCI transmission without dropping the low priority UCI transmission. In some cases, the UE may perform separate channel encoding to have unequal error protection for the high priority UCI transmission and the low priority UCI transmission.

In some cases, how the UE multiplexes the UCI transmissions on the uplink shared channel may be based on payload sizes of the UCI transmissions. For example, if a payload size for a UCI transmission is less than or equal to a threshold bit size, the UCI transmission may puncture the uplink shared channel. In some cases, when the payload size for the UCI transmission is less than or equal to the threshold bit size, the UE may assume the payload size is equal to the threshold bit size to select the resources, even if the actual payload size is smaller. If the payload size is greater than the threshold bit size, the uplink shared channel may rate match around the UCI transmission. The threshold bit size may be, for example, two bits, where any UCI transmission which is two bits or smaller may puncture the uplink shared channel, and the uplink shared channel may be rate matched around UCI transmissions which are greater than two bits.

The UE may first map the high priority UCI transmission to a first set of resources on the uplink shared channel. The UE may then map the low priority UCI transmission to a second set of resources on the uplink shared channel after mapping the high priority UCI transmission. In some examples, the low priority UCI transmission may not occupy any resources that are used or reserved for the high priority UCI transmission. The UE may then select resources for the uplink shared channel message after selecting resources for the high priority and low priority UCI messages. In some cases, the UE may be scheduled for a CSI transmission that may overlap one or more HARQ ACK messages and an uplink shared channel. The UE may implement similar techniques to select resources to multiplex the CSI transmission on the uplink shared channel with the HARQ ACK messages.

Aspects of the disclosure are initially described in the context of wireless communications systems. Aspects of the disclosure are further illustrated by and described with reference to apparatus diagrams, system diagrams, and flowcharts that relate to multiplexing high priority and low priority UCI on a physical uplink shared channel (PUSCH).

FIG. 1 illustrates an example of a wireless communications system 100 that supports multiplexing high priority and low priority UCI on a PUSCH in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as category M (CAT-M), Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may be scheduled to transmit multiple messages to a base station 105 at a same or overlapping time on a radio frequency spectrum band. For example, the UE 115 may receive DCI scheduling the UE 115 to transmit a high priority UCI transmission, a low priority UCI transmission, and a PUSCH data transmission.

In some examples, a UE 115 may be scheduled for overlapping HARQ ACK transmission, CSI transmission, and PUSCH data transmission. In some cases, a group of channels may be referred to as overlapping if each channel overlaps with at least one other channel in the group. Additionally, or alternatively, the group of channels may be considered overlapping if the group of channels cannot be further partitioned into two subsets, where channels in the different subsets are not overlapping. For example, regardless of how the channels in the group are partitioned, there may be at least one channel in the first subset that would overlap with another channel in the second subset of channels. Therefore, channels may still be overlap even if each channel in the group does not mutually overlap with each other.

In some wireless communications systems, the UE 115 may drop any low priority HARQ ACK transmissions. The HARQ ACK feedback (e.g., the high priority HARQ ACK feedback) may be first mapped to the PUSCH. The HARQ ACK feedback may be mapped to the PUSCH starting from a first non-demodulation reference signal (DMRS) symbol after a first DMRS symbol of the channel. If the PUSCH is punctured by the HARQ ACK, the UE 115 may map a first part of the CSI transmission starting after a certain amount of reserved HARQ ACK resource elements. The first part of the CSI transmission may not be mapped on the reserved HARQ ACK resource elements. A second part of the CSI transmission may not be mapped on the resource elements for the first part of the CSI transmission. The second part of the CSI transmission may be mapped to the reserved HARQ ACK resource elements. If the PUSCH rate matches the HARQ ACK, the UE 115 may map the HARQ ACK first then the first part of the CSI transmission. The UE may not map the first part of the CSI transmission or the second part of the CSI transmission to the resource elements for the HARQ ACK. Resources for the PUSCH data transmission may be mapped to the remaining resources which are not used for the HARQ ACK or CSI transmissions. Some of these techniques may be implemented by wireless communications systems described herein. However, the wireless communications systems described herein may support enhanced techniques to multiplex the low priority UCI transmissions instead of dropping them.

Wireless communications systems described herein, such as the wireless communications system 100, may support techniques to multiplex high priority and low priority UCI transmissions on an uplink shared channel. Multiplexing high priority and low priority UCI transmissions on a PUSCH may be based on payload sizes of the UCI transmissions. For example, if a payload size for a UCI transmission is less than or equal to a threshold bit size, the UCI transmission may puncture the uplink shared channel. In some cases, when the payload size for the UCI transmission is less than or equal to the threshold bit size, the UE 115 may assume the payload size is equal to the threshold bit size to select the resources, even if the actual payload size is smaller. If the payload size is greater than the threshold bit size, the uplink shared channel may rate match around the UCI transmission. The threshold bit size may be, for example, two bits, where any UCI transmission which is two bits or smaller may puncture the uplink shared channel, and the uplink shared channel may be rate matched around UCI transmissions which are greater than two bits.

The UE 115 may first map the high priority UCI transmission to a first set of resources on the uplink shared channel. The UE 115 may then map the low priority UCI transmission to a second set of resources on the uplink shared channel after mapping the high priority UCI transmission. In some examples, the low priority UCI transmission may not occupy any resources that are used or reserved for the high priority UCI transmission. The UE 115 may then select resources for the uplink shared channel message after selecting resources for the high priority and low priority UCI messages.

Figure 2:
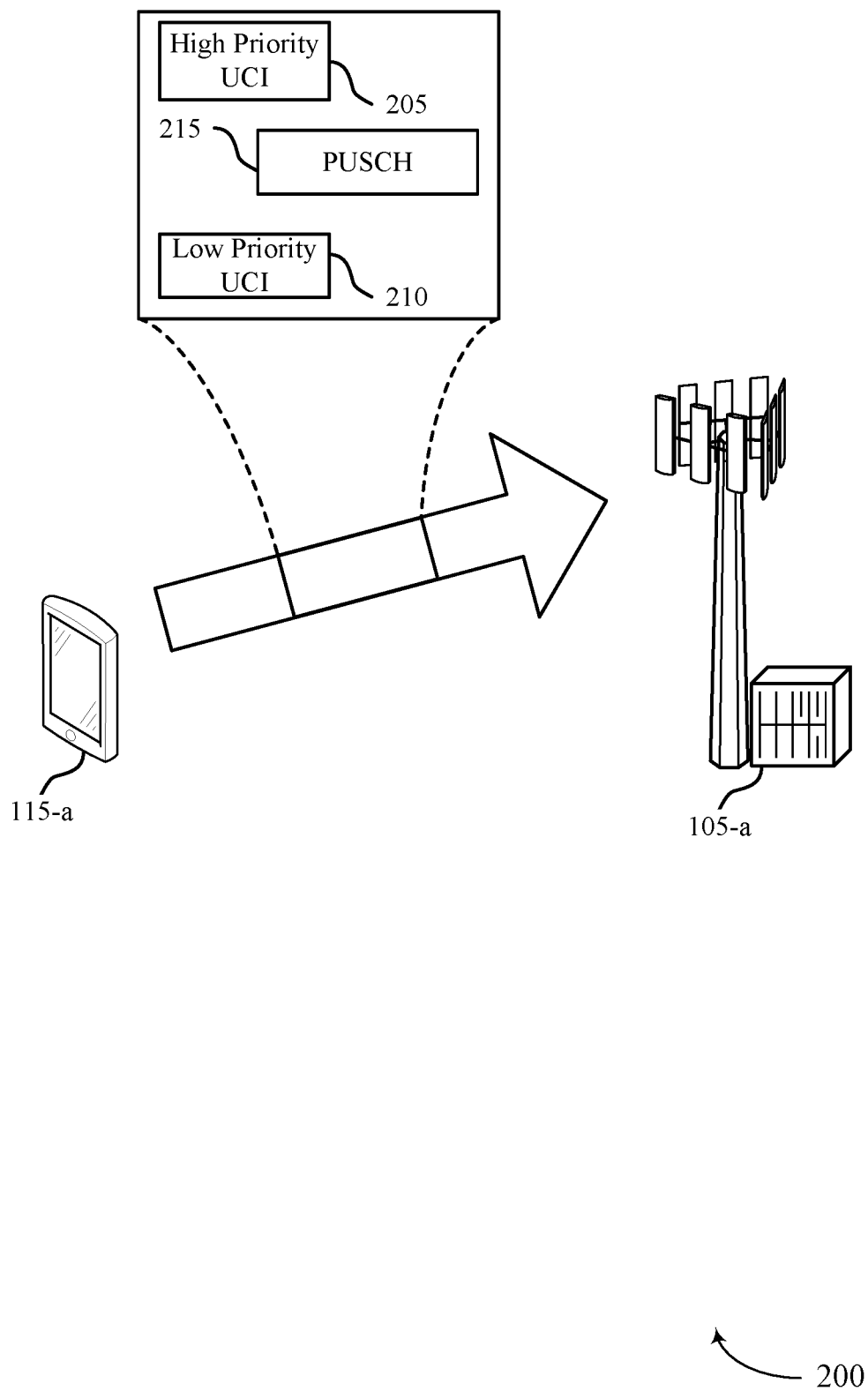
FIG. 2 illustrates an example of a wireless communications system that supports multiplexing high priority and low priority UCI on a PUSCH in accordance with aspects of the present disclosure.

FIG. 2 illustrates an example of a wireless communications system 200 that supports multiplexing high priority and low priority UCI on a PUSCH in accordance with aspects of the present disclosure. The wireless communications system 200 includes UE 115-*a* and base station 105-*a*, which may be respective examples of a UE 115 and a base station 105 as described with reference to FIG. 1.

UE 115-*a* may be scheduled to transmit multiple messages to base station 105-*a* at a same or overlapping time on a radio frequency spectrum band. For example, UE 115-*a* may receive DCI scheduling UE 115-*a* to transmit a high priority UCI transmission 205, a low priority UCI transmission 210, and a PUSCH data transmission 215. The high priority UCI transmission 205 may be an example of a UCI transmission with priority index 1, and the low priority UCI transmission 210 may be an example of a UCI transmission with priority index 0. An uplink transmission may be associated with a priority index of 0 or 1, where priority index 1 may have a higher priority than priority index 0. The high priority UCI transmission 205 and low priority UCI transmission 210 may be examples of a HARQ acknowledgment transmission or a CSI transmission.

In some wireless communications systems, a UE 115 may drop low priority transmissions that collide with higher priority transmissions. For example, if the UE 115 detects a DCI scheduling a physical uplink control channel (PUCCH) or PUSCH transmission of higher priority (e.g., with a larger priority index) that would overlap a PUCCH or PUSCH transmission of lower priority (e.g., with a lower priority index), the UE 115 may not transmit the PUCCH or PUSCH transmission with the lower priority index. However, this may result in significant latency for the lower priority transmission, as the UE 115 may wait to transmit the lower priority message at a later point (e.g., a later transmission opportunity or after receiving another grant). In some cases, if the UE 115 drops a low priority UCI including HARQ ACK feedback, the UE 115 may not be able to resend the dropped HARQ ACK. In this case, the base station 105 may retransmit the downlink packet, assuming a negative acknowledgment (NACK) for the downlink packet when no HARQ ACK is received. This may further lead to spectral inefficiency, as the base station 105 may retransmit downlink packets which were successfully received at the UE 115.

The wireless communications system 200 may support techniques to multiplex high priority and low priority UCI transmissions on a PUSCH. For example, UE 115-*a* may multiplex the high priority UCI transmission 205, the low priority UCI transmission 210, and the PUSCH data transmission 215 on a PUSCH. UE 115-*a* may select resources to provide better protection for the high priority UCI transmission 205 without dropping the low priority UCI transmission 210. In some cases, UE 115-*a* may perform separate channel encoding to the high priority UCI transmission 205 and the low priority UCI transmission 210 to have unequal error protection.

In some cases, how UE 115-*a* multiplexes a UCI transmission on an uplink shared channel may be based on a payload size of the UCI transmission. For example, if a payload size for a UCI transmission (e.g., the high priority UCI transmission 205 or the low priority UCI transmission 210) is less than or equal to a threshold bit size, the UCI transmission may puncture the PUSCH. For example, UE 115-*a* may reserve resources for the UCI transmission and map the UCI transmission to the reserved resources after selecting all other resources on the PUSCH. If the payload size is greater than the threshold bit size, the PUSCH may rate match around the UCI transmission.

For example, UE 115-*a* may select a first set of resources for the UCI transmission, and UE 115-*a* may select a second set of resources for the PUSCH which do not overlap with the first set of resources selected for the UCI transmission. The threshold bit size may be, for example, two bits, where any UCI transmission which is two bits or smaller may puncture the PUSCH, and the PUSCH may be rate matched around UCI transmissions which are greater than two bits.

UE 115-*a* may first map the high priority UCI transmission 205 to resources on the PUSCH. UE 115-*a* may map the low priority UCI transmission 210 to the PUSCH after mapping the high priority UCI transmission 205. In some examples, the low priority UCI transmission 210 may not occupy any resources that are used or reserved for the high priority UCI transmission 205. UE 115-*a* may then select resources for the PUSCH message after selecting resources for the high priority and low priority UCI messages. Example cases for different sized low priority and high priority UCI transmissions are described in more detail with reference to FIG. 3.

In some cases, UE 115-*a* may be scheduled for a CSI transmission that may overlap one or more of the HARQ ACK messages or the PUSCH. If any portion of the CSI transmission has a lower priority than the PUSCH transmission, the portion of the CSI with the lower priority may be dropped. In some cases, both high priority CSI and low priority CSI are present. In some examples, UE 115-*a* may drop the low priority CSI and only transmit the high priority CSI. In some other examples, UE 115-*a* may multiplex the high priority and low priority CSI on the PUSCH together with the high priority and low priority HARQ ACK messages.

In some examples, UE 115-*a* may be configured to transmit up to a threshold number of different types of UCI in a single overlapping transmission. Examples of different types of UCI include UCI containing high priority HARQ ACK, UCI containing low priority HARQ ACK, UCI containing a first part of low priority CSI, UCI containing a second part of low priority CSI, UCI containing a first part of high priority CSI, and UCI containing a second part of high priority CSI. UE 115-*a* may drop portions of UCI based on a threshold number of types of UCI. For example, if UE 115-*a* is configured to transmit up to three types of UCI multiplexed together, UE 115-*a* may drop some types of UCI to transmit three types of UCI. These techniques for dropping portions of UCI according to priority and a threshold number of types of UCI may be implemented with, or implement aspects of, the puncturing techniques or rate-matching techniques, or both, described herein.

In some cases, base station 105-*a* may configure UE 115-*a* with the threshold number of types of UCI described herein. For example, base station 105-*a* may transmit DCI, RRC signaling, a MAC control element (CE), or any combination thereof, including an indication of the threshold to configure UE 115-*a* with the threshold. Additionally, or alternatively, UE 115-*a* may be preconfigured with the threshold, or the threshold may be stored or configured in memory at UE 115-*a*.

In some cases, the prioritization of the types of UCI may be similar to other priority schemes described herein. For example, in some cases, low priority HARQ ACK may be prioritized over both parts of high priority CSI. In some other examples, both parts of high priority CSI may be prioritized over low priority HARQ ACK. In some cases, these prioritizations or priority orderings may be used to drop at least portions of UCI with lower priority when the PUSCH resource is unable (e.g., not large enough) to accommodate all of the payloads of the different UCI.

In an example, UE 115-*a* may be scheduled to transmit (e.g., piggyback) low priority HARQ ACK, high priority HARQ ACK, a first part of low priority CSI, and a second part of low priority CSI on PUSCH resources for the PUSCH data transmission 215. In some cases, UE 115-*a* may drop the second part of the low priority CSI. In some cases, UE 115-*a* may rate match or puncture the PUSCH resources for high priority HARQ ACK. In some cases, UE 115-*a* may rate match the PUSCH resources and perform resource element mapping for the low priority HARQ ACK. In some cases, UE 115-*a* may rate match and perform resource element mapping for the first part of the low priority CSI.

In some cases, UE 115-*a* may be configured with a threshold of three types of UCI, and UE 115-*a* may drop the second part of the low priority CSI. UE 115-*a* may transmit the low priority HARQ ACK, the high priority HARQ ACK, and the first part of the low priority CSI on the PUSCH resources (e.g., satisfying the threshold of three types of UCI). In some cases, UE 115-*a* may be configured with a threshold of two types of UCI, and UE 115-*a* may drop the first part of the low priority CSI and the second part of the low priority CSI. UE 115-*a* may transmit the low priority HARQ ACK and the high priority HARQ ACK satisfying the threshold of two types of UCI.

In another example, UE 115-*a* may be scheduled to piggyback high priority HARQ ACK, low priority HARQ ACK, and a first part of a high priority CSI. If UE 115-*a* is configured with a threshold of two types of UCI, UE 115-*a* may drop either the low priority HARQ ACK or the first part of the high priority CSI based on how the different types of UCI are prioritized. For example, if the first part of high priority CSI has a higher priority than low priority HARQ ACK, UE 115-*a* may drop the low priority HARQ ACK. If the low priority HARQ ACK has a higher priority than the first part of high priority CSI, UE 115-*a* may drop the first part of high priority CSI. Alternatively, UE 115-*a* may be configured with a threshold of three types of UCI, and UE 115-*a* may transmit all three (e.g., the high priority HARQ ACK, the low priority HARQ ACK, and the first part of the high priority CSI).

In an example, UE 115-*a* may multiplex high priority CSI with two parts, low priority CSI with two parts, high priority HARQ ACK feedback, and low priority HARQ ACK feedback on a PUSCH. The first part of the CSI may be rate matched around the HARQ ACK feedback (e.g., either around reserved resources or determined resources). The second part of the CSI message may rate match the HARQ ACK feedback if the HARQ ACK feedback is more than two bits, or the second part of the CSI message may be punctured by the HARQ ACK feedback if the feedback is less than or equal to a bit size threshold (e.g., two bits). In a first example, UE 115-*a* may first select resources for the high priority HARQ ACK feedback, then the first part of the high priority CSI message, then the second part of the high priority CSI message, then the low priority HARQ ACK feedback, then the first part of the low priority CSI message, then the second part of the low priority CSI message, then the uplink shared channel. In a second example, UE 115-*a* may first select resources for the high priority HARQ ACK feedback, then the low priority HARQ ACK feedback, then the first part of the high priority CSI message, then the second part of the high priority CSI message, then the first part of the low priority CSI message, then the second part of the low priority CSI message, then the uplink shared channel. In some cases, UE 115-*a* may not select resources for dropped UCI or channels. For example, if UE 115-*a* drops the uplink shared channel transmission, UE 115-*a* may not select resources for the uplink shared channel transmission. Similarly, if UE 115-*a* drops the second part of the low priority CSI message, UE 115-*a* may not select resources for the second part of the low priority CSI message.

Figure 3:
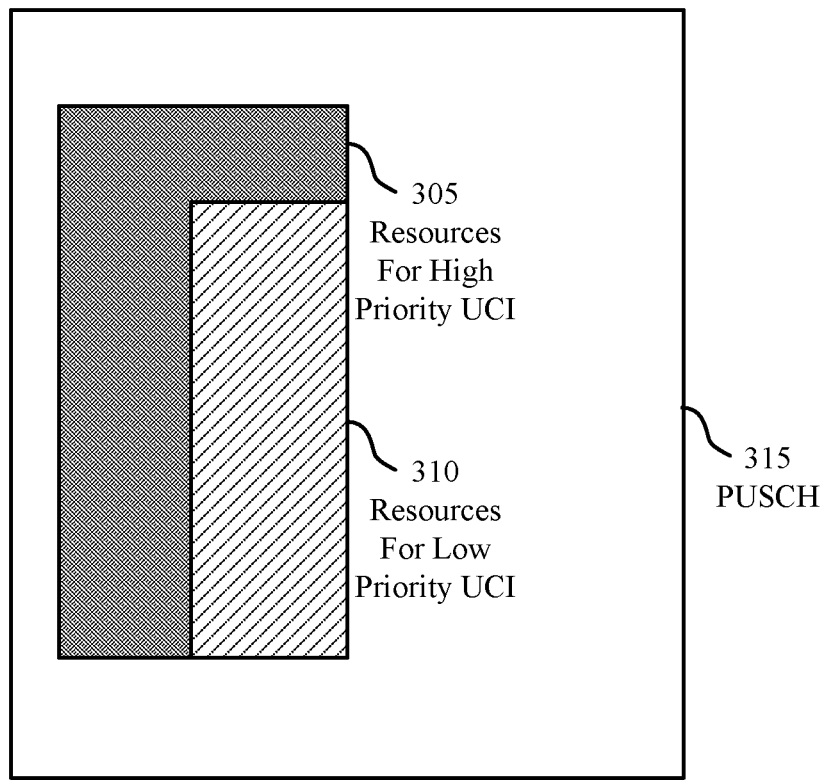
FIG. 3 illustrates an example of a resource selection scheme that supports multiplexing high priority and low priority UCI on a PUSCH in accordance with aspects of the present disclosure.

FIG. 3 illustrates an example of a resource selection scheme 300 that supports multiplexing high priority and low priority UCI on a PUSCH in accordance with aspects of the present disclosure.

A UE 115 may multiplex high priority and low priority UCI transmissions on an uplink shared channel to a base station 105. The UE 115 may select sets of resources for the high priority and low priority UCI on the uplink shared channel to provide better protection for the high priority UCI while still transmitting the lower priority UCI. The resource selection for a UCI transmission may be based on a payload size of the UCI. If the payload is equal to or below a threshold bit size (e.g., two bits), the corresponding UCI transmission may puncture the uplink shared channel. If the payload is above the threshold bit size, the corresponding UCI transmission may be rate matched by the uplink shared channel. In some cases, the high priority and low priority UCI transmissions may be HARQ ACK transmissions. Additionally, or alternatively, the UE 115 may multiplex CSI transmissions on the uplink shared channel (e.g., with the HARQ ACK transmissions). The resource selection scheme 300 provides four example scenarios for multiplexing high priority and low priority UCI on an uplink shared channel, although other examples may implement these techniques.

In a first case, both the high priority UCI transmission and the low priority UCI transmission may have payload sizes which are less than or equal to the threshold bit size. The UE 115 may determine a first set of resources 305 for the high priority UCI transmission. For the first case, the first set of resources 305 may be reserved resources for the high priority UCI transmission. The UE 115 may then determine a second set of resources 310 for the low priority UCI transmission, where the second set of resources 310 are non-overlapping with the first set of resources 305. In the first case, the second set of resources 310 may be reserved resources for the low priority UCI transmission. In some cases, the reserved resources for both the low priority UCI transmission and the high priority UCI transmission may be determined by assuming the payload sizes for the UCI transmissions are equal to the threshold bit size. For example, the UE 115 may assume payload sizes of two bits for the high priority and low priority UCI transmissions.

In the first case, if there is uplink shared channel data, the UE 115 may determine a third set of resources 315 to map the uplink shared channel. The resources for the uplink shared channel may contain the reserved resources (e.g., the first set of resources 305 and the second set of resources 310). Then, the UE 115 may map the high priority UCI transmission and the low priority UCI transmission onto the corresponding reserved resources. In some cases, if the third set of resources 315 resources overlap the first set of resources 305 and the second set of resources 310, the high priority UCI transmission and the low priority UCI transmission may puncture the uplink shared channel. In some examples, the actual used resources for the high priority and low priority UCI transmissions may be less than the reserved resources. For example, the second set of resources 310 may have been reserved for two bits, but the low priority UCI transmission may include a payload size of one bit. In this example, the low priority UCI transmission may be sent on resources determined for the one bit, and resources for the other bit may be reserved or reused. In some cases, if there is not uplink shared channel data, the UE 115 may not select or determine the third set of resources 315.

In a second case, the high priority UCI transmission may have a payload size which is less than or equal to the threshold bit size, and the low priority UCI transmission may have a payload size which is greater than the threshold bit size. The UE 115 may determine a first set of resources 305 for the high priority UCI transmission. For the second case, the first set of resources 305 may be reserved resources for the high priority UCI transmission. The UE 115 may then determine a second set of resources 310 for the low priority UCI transmission, where the second set of resources 310 are non-overlapping with the first set of resources 305. In the second case, the second set of resources 310 may not be reserved resources. In some cases, the reserved resources for the high priority UCI transmission may be determined by assuming the payload size for the high priority UCI transmission is equal to the threshold bit size. For example, the UE 115 may assume a payload size of two bits for the high priority UCI transmission.

In the second case, if there is uplink shared channel data, the UE 115 may determine a third set of resources 315 to map the uplink shared channel. The third set of resources 315 for the uplink shared channel may contain the reserved resources (e.g., the first set of resources 305 but not the second set of resources 310). Then, the UE 115 may map the high priority UCI transmission onto the corresponding reserved resources. The third set of resources 315 may rate match around the second set of resources 310 for the low priority UCI transmission. In some cases, if the third set of resources 315 overlaps the first set of resources 305, the high priority UCI transmission may puncture the uplink shared channel. In some examples, the actual used resources for the high priority UCI transmission may be less than the reserved resources. For example, the first set of resources 305 may have been reserved for two bits, but the high priority UCI transmission may include a payload size of one bit. In this example, the high priority UCI transmission may be sent on resources determined for the one bit, and resources for the other bit may be reserved or reused.

In a third case, the low priority UCI transmission may have a payload size which is less than or equal to the threshold bit size, and the high priority UCI transmission may have a payload size which is greater than the threshold bit size. The UE 115 may determine a first set of resources 305 for the high priority UCI transmission. The UE 115 may then determine a second set of resources 310 for the low priority UCI transmission, where the second set of resources 310 are non-overlapping with the first set of resources 305. For the third case, the second set of resources 310 may be reserved resources for the low priority UCI transmission. In some cases, the second set of resources 310 for the low priority UCI transmission may be determined by assuming the payload size for the low priority UCI transmission is equal to the threshold bit size.

In the third case, if there is uplink shared channel data, the UE 115 may determine a third set of resources 315 to map the uplink shared channel. The third set of resources 315 for the uplink shared channel may contain the reserved resources (e.g., the second set of resources 310 but not the first set of resources 305). Then, the UE 115 may map the low priority UCI transmission onto the corresponding reserved resources. The third set of resources 315 may rate match around the first set of resources 305 for the high priority UCI transmission. In some cases, if the third set of resources 315 overlap the second set of resources 310, the low priority UCI transmission may puncture the uplink shared channel. In some examples, the actual used resources for the low priority UCI transmission may be less than the reserved resources. For example, the second set of resources 310 may have been reserved for two bits, but the low priority UCI transmission may include a payload size of one bit. In this example, the low priority UCI transmission may be sent on resources determined for the one bit, and resources for the other bit may be reserved or reused.

In a fourth case, the low priority UCI transmission and the high priority UCI transmission may both have a payload size which is greater than the threshold bit size. The UE 115 may determine a first set of resources 305 for the high priority UCI transmission. The UE 115 may then determine a second set of resources 310 for the low priority UCI transmission, where the second set of resources 310 are non-overlapping with the first set of resources 305.

In the fourth case, if there is uplink shared channel data, the UE 115 may determine a third set of resources 315 to map the uplink shared channel. The third set of resources 315 for the uplink shared channel may not overlap with the first set of resources 305 or the second set of resources 310. For example, the third set of resources 315 may rate match around the first set of resources 305 for the high priority UCI transmission and the second set of resources 310 for the low priority UCI transmission.

In an example, the UE 115 may also have CSI to transmit, and the UE 115 may multiplex the CSI transmission with a high priority HARQ ACK transmission and a low priority HARQ ACK transmission. For example, both the high priority HARQ ACK transmission and the low priority HARQ ACK transmission may have a payload size which is less than or equal to the threshold bit size. The UE 115 may determine a first set of resources 305 for the high priority HARQ ACK transmission. The UE 115 may then determine a second set of resources 310 for the low priority UCI transmission, where the second set of resources 310 are non-overlapping with the first set of resources 305. The first set of resources 305 may be reserved for the high priority HARQ ACK transmission, and the second set of resources 310 may be reserved for the low priority HARQ ACK transmission.

Then, if the CSI transmission has a first part, the UE 115 may determine a fourth set of resources on the uplink shared channel to map the first part of the CSI transmission. The fourth set of resources may not overlap with the first set of resources 305 or the second set of resources 310. If the CSI transmission has a second part, the UE 115 may determine a fifth set of resources on the uplink shared channel to map the second part of the CSI. The fifth set of resources may not overlap the fourth set of resources (e.g., for the first part of the CSI transmission), but the fifth set of resources may overlap the first set of resources 305 and the second set of resources 310 for the high priority and low priority UCI transmissions.

If there is uplink shared channel data to transmit, the UE 115 may determine a third set of resources 315 to map the uplink shared channel. The resources for the uplink shared channel may contain the first set of resources 305 and the second set of resources 310 (e.g., for the low priority and high priority HARQ ACK transmissions), but the third set of resources may not include the fourth set of resources or the fifth set of resources (e.g., for the CSI transmission).

Then, the UE 115 may map the high priority HARQ ACK transmission and the low priority HARQ ACK transmission onto the corresponding reserved resources. In some cases, if the third set of resources 315 overlaps the first set of resources 305 and the second set of resources 310, the high priority HARQ ACK transmission and the low priority HARQ ACK transmission may puncture the uplink shared channel.

Additionally, if the fifth set of resources overlaps the first set of resources 305 and the second set of resources 310, the high priority HARQ ACK transmission and the low priority HARQ ACK transmission may puncture the second part of the CSI transmission.

In some cases, the physical uplink shared channel may not include uplink shared channel data. For example, the techniques described herein may be implemented to map or drop, or both, low priority and high priority uplink control information on uplink shared channel resources even if the uplink shared channel resource is scheduled without a corresponding uplink data transmission (e.g., the uplink shared channel resource does not include uplink shared channel data, or the UE 115 does not transmit uplink shared channel data on the uplink shared channel resource).

Figure 4:
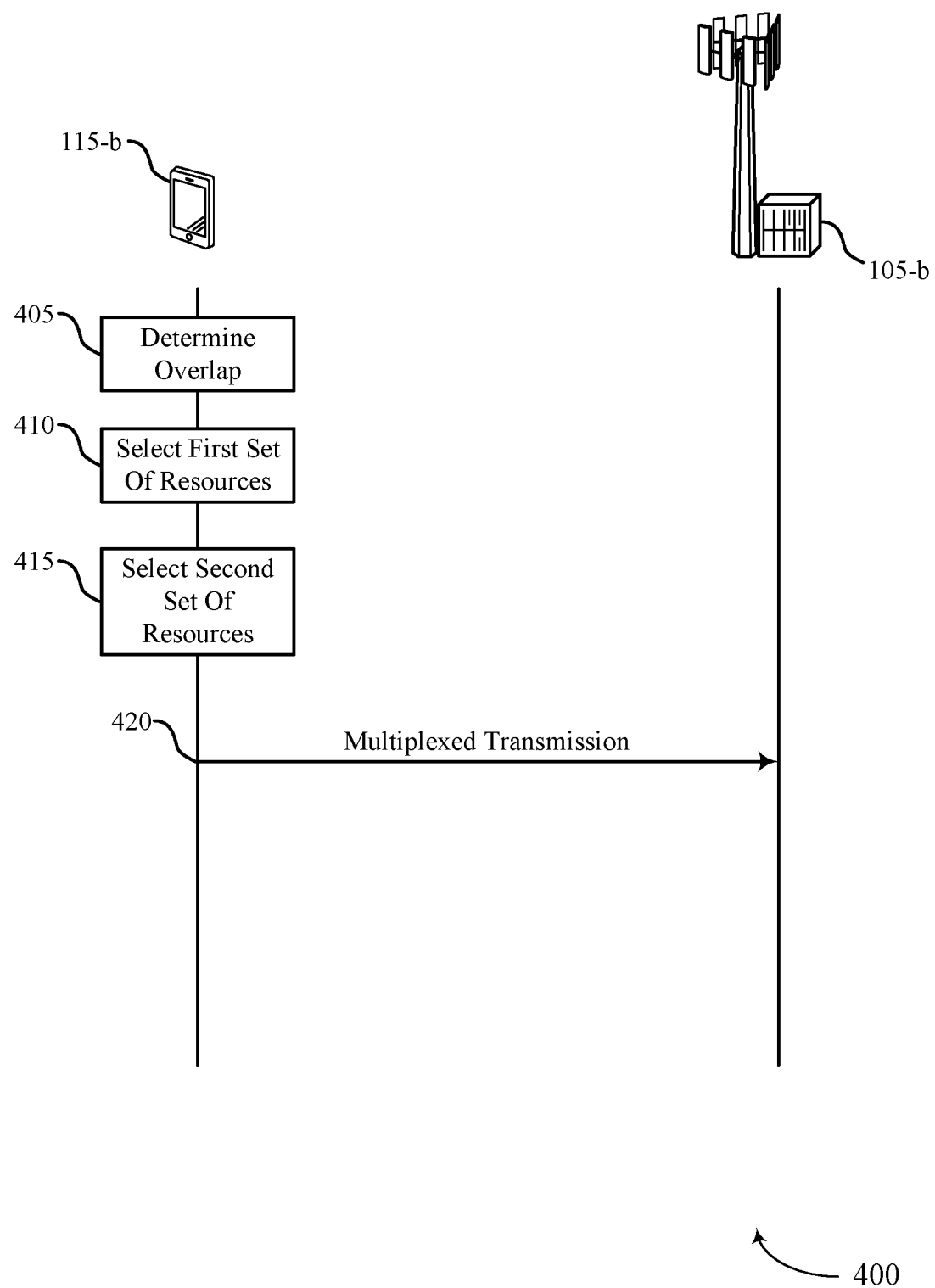
FIG. 4 illustrates an example of a process flow that supports multiplexing high priority and low priority UCI on a PUSCH in accordance with aspects of the present disclosure.

FIG. 4 illustrates an example of a process flow 400 that supports multiplexing high priority and low priority UCI on a PUSCH in accordance with aspects of the present disclosure. Process flow 400 may be implemented by UE 115-*b* or base station 105-*b*, or both, which may be respective examples of a UE 115 and a base station 105 described with reference to FIGS. 1 and 2.

At 405, UE 115-*b* may determine that a first UCI message with a first priority, a second UCI message with a second priority, and an uplink shared channel message overlap, where the first priority is higher than the second priority. For example, the first UCI message may have a priority index of 1, and the second UCI message may have a priority message of 0. In some cases, the first UCI message and the second UCI message may each be an example of a HARQ ACK message.

At 410, UE 115-*b* may select a first set of resources on the PUSCH for the first UCI message based on the first priority. At 415, UE 115-*b* may select a second set of resources on the PUSCH for the second UCI message based on the second priority, where the second set of resources is non-overlapping with the first set of resources.

The resource selections at 410 and 415 may be based on a payload size for the first UCI message and the second UCI message. For example, four different cases are described with reference to FIG. 3. In some cases, UE 115-*b* may transmit a multiplexed transmission at 420 according to one or more of the following cases.

In a first case, UE 115-*b* may determine that a first payload size of the first UCI message and a second payload size of the second UCI message are each equal to or below a bit size threshold. In the first case, selecting the first set of resources and selecting the second set of resources may include reserving the first set of resources for the first UCI message and the second set of resources for the second UCI message based on the first payload size and the second payload size being equal to or below the bit size threshold. In this example, the first UCI message and the second UCI message may puncture the PUSCH.

In a second case, UE 115-*b* may determine that a first payload size of the first UCI message is equal to or below a bit size threshold, where selecting the first set of resources may include reserving the first set of resources for the first UCI message based on the first payload size being equal to or below the bit size threshold. UE 115-*b* may determine that a second payload size of the second UCI message is above the bit size threshold. In the second case, the PUSCH may rate match around the second UCI message, and the first UCI message may puncture the PUSCH.

In a third case, UE 115-*b* may determine that a first payload size of the first UCI message is above the bit size threshold and that a second payload size of the second UCI message is equal to or below a bit size threshold. In the third case, selecting the second set of resources may include reserving the second set of resources for the second UCI message based on the second payload size being equal to or below the bit size threshold. In the third case, the PUSCH may rate match around the first UCI message, and the second UCI message may puncture the PUSCH.

In a fourth case, UE 115-*b* may determine that a first payload size of the first UCI message and a second payload size of the second UCI message are each above a bit size threshold. In this case, the third set of resources for the PUSCH may not overlap with the first set of resources or the second set of resources. The PUSCH may rate match around the first set of resources and the second set of resources.

In some examples, UE 115-*b* may determine that a CSI transmission overlaps one or more of the first uplink control information message, the second uplink control information message, or the uplink shared channel message. In some cases, the CSI may be aperiodic CSI on PUSCH resources, semi-persistent CSI on PUSCH resources, periodic CSI on PUCCH resources, or semi-persistent CSI on PUCCH resources. For aperiodic CSI and semi-persistent CSI on PUSCH resources, the aperiodic CSI and semi-persistent CSI may be originally scheduled to be transmitted over or multiplexed on a PUSCH channel (e.g., multiplexed as a scheduling decision instead of a scheduling overlapping). For semi-persistent CSI on PUCCH resources and periodic CSI, UE 115-*b* may not multiplex (e.g., may not need to multiplex) the CSI on the PUSCH resources if the PUCCH transmission including the CSI overlaps with the PUSCH transmission.

In some cases, UE 115-*b* may determine a quantity of types of uplink control information which overlap the uplink shared channel message exceeds a threshold. Examples of different types of UCI include UCI containing high priority HARQ ACK, UCI containing low priority HARQ ACK, UCI containing a first part of low priority CSI, UCI containing a second part of low priority CSI, UCI containing a first part of high priority CSI, and UCI containing a second part of high priority CSI. For example, if UE 115-*b* is configured with a threshold of 3 types of UCI, UE 115-*b* may drop lower priority UCI until UE 115-*b* has 3 types of UCI to transmit. UE 115-*b* may drop the lower priority UCI if the total number of UCI types exceeds the thresholds. For example, UE 115-*b* may drop at least a portion of the CSI transmission, a portion of the first uplink control information, or a portion of the second uplink control information message, or any combination thereof, based on the quantity exceeding the threshold.

Base station 105-*b* may monitor the PUSCH for the multiplexed transmission and decode the first UCI message, the second UCI message, and the uplink shared channel message. Base station 105-*b* may identify the first set of resources on the PUSCH for the first UCI message and identify the second set of resources on the PUSCH for the second UCI message. Base station 105-*b* may decode the first UCI message on the first set of resources, the second UCI message on the second set of resources, and the uplink shared channel message on the third set of resources on the PUSCH. Base station 105-b may demap the high priority UCI and the low priority UCI from the first set of resources and the second set of resources accordingly.

Figure 5:
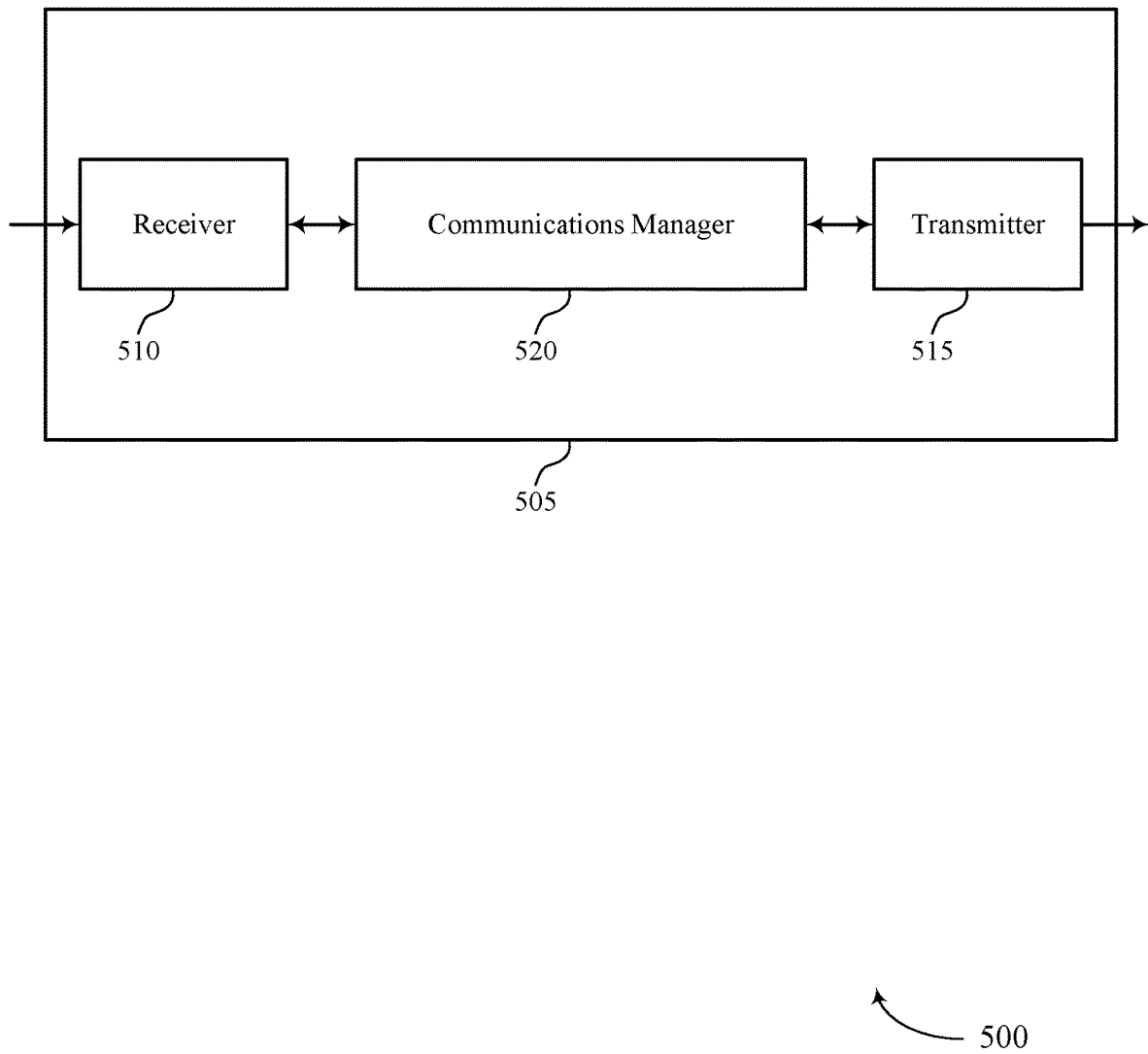
FIGS. 5 and 6 show block diagrams of devices that support multiplexing high priority and low priority UCI on a PUSCH in accordance with aspects of the present disclosure.

FIG. 5 shows a block diagram 500 of a device 505 that supports multiplexing high priority and low priority UCI on a PUSCH in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to multiplexing high priority and low priority UCI on a PUSCH). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to multiplexing high priority and low priority UCI on a PUSCH). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of multiplexing high priority and low priority UCI on a PUSCH as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, at least one processor and memory coupled to the at least one processor may be configured to perform one or more of the functions described herein (e.g., by executing, by the at least one processor, instructions stored in the memory).

Additionally or alternatively, in some examples, the communications manager 520, the receiver 510, the transmitter 515, or various combinations or components thereof may be implemented in code (e.g., as communications management software) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for determining that a first UCI message with a first priority, a second UCI message with a second priority, and an uplink shared channel message overlap, where the first priority is higher than the second priority. The communications manager 520 may be configured as or otherwise support a means for selecting a first set of resources on the PUSCH for the first UCI message based on the first priority. The communications manager 520 may be configured as or otherwise support a means for selecting a second set of resources on the PUSCH for the second UCI message based on the second priority, where the second set of resources is non-overlapping with the first set of resources. The communications manager 520 may be configured as or otherwise support a means for transmitting the first UCI message on the first set of resources and the second UCI message on the second set of resources on the PUSCH.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced latency for low priority UCI transmissions. For example, instead of dropping a low priority UCI transmission which collides with a PUSCH data transmission and a high priority UCI transmission, a UE 115 may implement techniques to multiplex the low priority UCI transmission, high priority UCI transmission, and PUSCH data transmission on a PUSCH. These techniques may reduce latency for the low priority UCI transmission compared to dropping the low priority UCI while still providing protection for the high priority UCI transmission.

Figure 6:
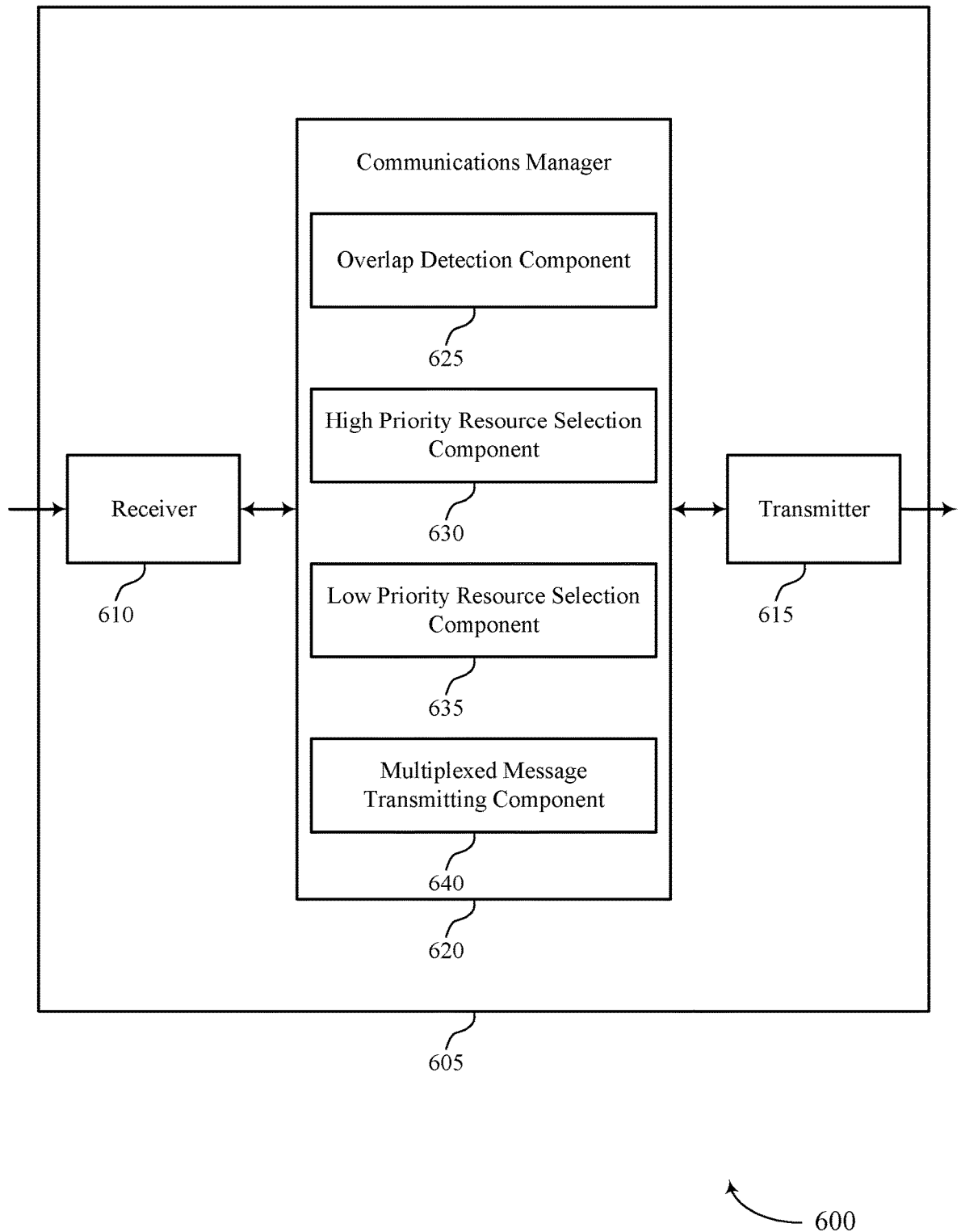

FIG. 6 shows a block diagram 600 of a device 605 that supports multiplexing high priority and low priority UCI on a PUSCH in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to multiplexing high priority and low priority UCI on a PUSCH). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to multiplexing high priority and low priority UCI on a PUSCH). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of multiplexing high priority and low priority UCI on a PUSCH as described herein. For example, the communications manager 620 may include an overlap detection component 625, a high priority resource selection component 630, a low priority resource selection component 635, a multiplexed message transmitting component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The overlap detection component 625 may be configured as or otherwise support a means for determining that a first UCI message with a first priority, a second UCI message with a second priority, and an uplink shared channel message overlap, where the first priority is higher than the second priority. The high priority resource selection component 630 may be configured as or otherwise support a means for selecting a first set of resources on the PUSCH for the first UCI message based on the first priority. The low priority resource selection component 635 may be configured as or otherwise support a means for selecting a second set of resources on the PUSCH for the second UCI message based on the second priority, where the second set of resources is non-overlapping with the first set of resources. The multiplexed message transmitting component 640 may be configured as or otherwise support a means for transmitting the first UCI message on the first set of resources and the second UCI message on the second set of resources on the PUSCH.

Figure 7:
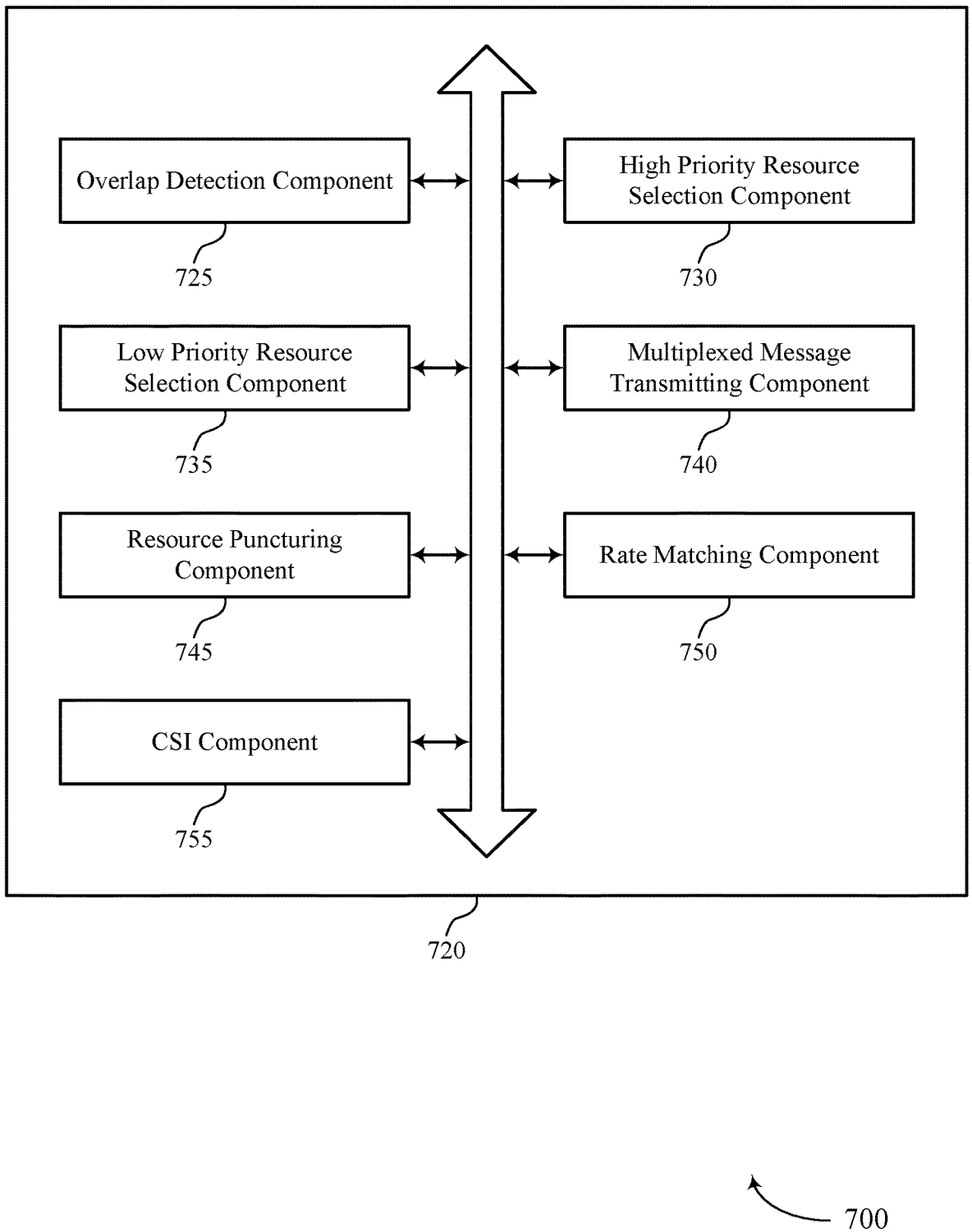
FIG. 7 shows a block diagram of a communications manager that supports multiplexing high priority and low priority UCI on a PUSCH in accordance with aspects of the present disclosure.

FIG. 7 shows a block diagram 700 of a communications manager 720 that supports multiplexing high priority and low priority UCI on a PUSCH in accordance with aspects of the present disclosure. The communications manager 720 may be an example of aspects of a communications manager 520, a communications manager 620, or both, as described herein. The communications manager 720, or various components thereof, may be an example of means for performing various aspects of multiplexing high priority and low priority UCI on a PUSCH as described herein. For example, the communications manager 720 may include an overlap detection component 725, a high priority resource selection component 730, a low priority resource selection component 735, a multiplexed message transmitting component 740, a resource puncturing component 745, a rate matching component 750, a CSI component 755, or any combination thereof. Each of these components may communicate, directly or indirectly, with one another (e.g., via one or more buses).

The communications manager 720 may support wireless communications at a UE in accordance with examples as disclosed herein. The overlap detection component 725 may be configured as or otherwise support a means for determining that a first UCI message with a first priority, a second UCI message with a second priority, and an uplink shared channel message overlap, where the first priority is higher than the second priority. The high priority resource selection component 730 may be configured as or otherwise support a means for selecting a first set of resources on the PUSCH for the first UCI message based on the first priority. The low priority resource selection component 735 may be configured as or otherwise support a means for selecting a second set of resources on the PUSCH for the second UCI message based on the second priority, where the second set of resources is non-overlapping with the first set of resources. The multiplexed message transmitting component 740 may be configured as or otherwise support a means for transmitting the first UCI message on the first set of resources and the second UCI message on the second set of resources on the PUSCH.

In some examples, the resource puncturing component 745 may be configured as or otherwise support a means for determining that a first payload size of the first UCI message and a second payload size of the second UCI message are each equal to or below a bit size threshold, where selecting the first set of resources and selecting the second set of resources includes reserving the first set of resources for the first UCI message and the second set of resources for the second UCI message based on the first payload size and the second payload size being equal to or below the bit size threshold.

In some examples, to support reserving the first set of resources and the second set of resources, the resource puncturing component 745 may be configured as or otherwise support a means for reserving the first set of resources and the second set of resources based on an assumption that the first payload and the second payload each include a number of bits equal to the bit size threshold.

In some examples, to support selecting the first set of resources and selecting the second set of resources, the resource puncturing component 745 may be configured as or otherwise support a means for puncturing the PUSCH with the first UCI message on the first set of resources, where the first UCI message occupies a fourth set of resources contained in the first set of resources. In some examples, to support selecting the first set of resources and selecting the second set of resources, the resource puncturing component 745 may be configured as or otherwise support a means for puncturing the PUSCH with the second UCI on the second set of resources, where the second UCI occupies a fifth set of resources contained in the second set of resources.

In some examples, the fourth set of resources is determined based on a first actual payload size of the first UCI message, and the fifth set of resources is determined based on a second actual payload size of the second UCI message. In some examples, the bit size threshold is two bits. In some examples, the third set of resources at least partially overlaps one or more of: the first set of resources or the second set of resources.

In some examples, the resource puncturing component 745 may be configured as or otherwise support a means for determining that a first payload size of the first UCI message is equal to or below a bit size threshold, where selecting the first set of resources includes reserving the first set of resources for the first UCI message based on the first payload size being equal to or below the bit size threshold. In some examples, the rate matching component 750 may be configured as or otherwise support a means for determining that a second payload size of the second UCI message is above the bit size threshold.

In some examples, to support reserving the first set of resources, the resource puncturing component 745 may be configured as or otherwise support a means for reserving the first set of resources based on an assumption that the first payload includes a number of bits equal to the bit size threshold.

In some examples, the rate matching component 750 may be configured as or otherwise support a means for selecting the third set of resources, where the third set of resources is non-overlapping with the second set of resources and overlapping with the first set of resources.

In some examples, to support selecting the first set of resources, the resource puncturing component 745 may be configured as or otherwise support a means for puncturing the PUSCH with the first UCI message, where the first UCI message occupies a fourth set of resources contained by the first set of resources, and where the fourth set of resources is determined based on an actual payload size of the first UCI message.

In some examples, the rate matching component 750 may be configured as or otherwise support a means for rate matching the uplink shared channel message around the second set of resources based on selecting the second set of resources.

In some examples, the rate matching component 750 may be configured as or otherwise support a means for determining that a first payload size of the first UCI message is above the bit size threshold. In some examples, the resource puncturing component 745 may be configured as or otherwise support a means for determining that a second payload size of the second UCI message is equal to or below a bit size threshold, where selecting the second set of resources includes reserving the second set of resources for the second UCI message based on the second payload size being equal to or below the bit size threshold.

In some examples, to support reserving the second set of resources, the resource puncturing component 745 may be configured as or otherwise support a means for reserving the second set of resources based on an assumption that the second payload includes a number of bits equal to the bit size threshold.

In some examples, the rate matching component 750 may be configured as or otherwise support a means for selecting the third set of resources, where the third set of resources is non-overlapping with the first set of resources and overlapping with the second set of resources.

In some examples, to support selecting the second set of resources, the resource puncturing component 745 may be configured as or otherwise support a means for puncturing the PUSCH with the second UCI message, where the second UCI message occupies a fourth set of resources contained by the second set of resources, and where the fourth set of resources is determined based on an actual payload size of the second UCI message.

In some examples, the rate matching component 750 may be configured as or otherwise support a means for rate matching the uplink shared channel message around the first set of resources based on selecting the first set of resources.

In some examples, the rate matching component 750 may be configured as or otherwise support a means for determining that a first payload size of the first UCI message and a second payload size of the second UCI message are each above a bit size threshold.

In some examples, the rate matching component 750 may be configured as or otherwise support a means for selecting the third set of resources, where the third set of resources is non-overlapping with the first set of resources and the second set of resources.

In some examples, the rate matching component 750 may be configured as or otherwise support a means for rate matching the uplink shared channel message around the first set of resources and the second set of resources based on selecting the first set of resources and the second set of resources.

In some examples, the CSI component 755 may be configured as or otherwise support a means for determining that a CSI transmission overlaps one or more of: the first UCI message, the second UCI message, or the uplink shared channel message.

In some examples, the CSI component 755 may be configured as or otherwise support a means for determining a quantity of types of uplink control information which overlap the uplink shared channel message exceeds a threshold. In some examples, the CSI component 755 may be configured as or otherwise support a means for dropping at least a portion of the CSI transmission, a portion of the first uplink control information, or a portion of the second uplink control information message, or any combination thereof, based on the quantity exceeding the threshold.

In some examples, the CSI component 755 may be configured as or otherwise support a means for receiving, from a base station, an indication of the threshold via DCI, a MAC CE, or RRC signaling.

In some examples, the CSI component 755 may be configured as or otherwise support a means for determining that a first portion of the CSI transmission has a lower priority than the uplink shared channel message. In some examples, the CSI component 755 may be configured as or otherwise support a means for dropping the first portion of the CSI transmission.

In some examples, the CSI component 755 may be configured as or otherwise support a means for determining a fourth set of resources on the PUSCH for a second portion of the CSI transmission having a same or higher priority than the uplink shared channel message. In some examples, the CSI component 755 may be configured as or otherwise support a means for transmitting the second portion of the CSI on the fourth set of resources.

In some examples, the CSI component 755 may be configured as or otherwise support a means for determining a fourth set of resources on the PUSCH for at least a first portion of the CSI transmission. In some examples, the CSI component 755 may be configured as or otherwise support a means for transmitting the first portion of the CSI transmission on the fourth set of resources. In some examples, the CSI component 755 may be configured as or otherwise support a means for rate matching the first portion of the CSI transmission around the first set of resources and the second set of resources.

In some examples, the CSI component 755 may be configured as or otherwise support a means for rate matching the first portion of the CSI transmission around the first set of resources and the second set of resources. In some examples, the CSI component 755 may be configured as or otherwise support a means for puncturing at least a portion of a fifth set of resources for a second portion of the CSI transmission with one or more of: the first set of resources or the second set of resources.

In some examples, one or more of the first UCI message or the second UCI message includes acknowledgment feedback.

Figure 8:
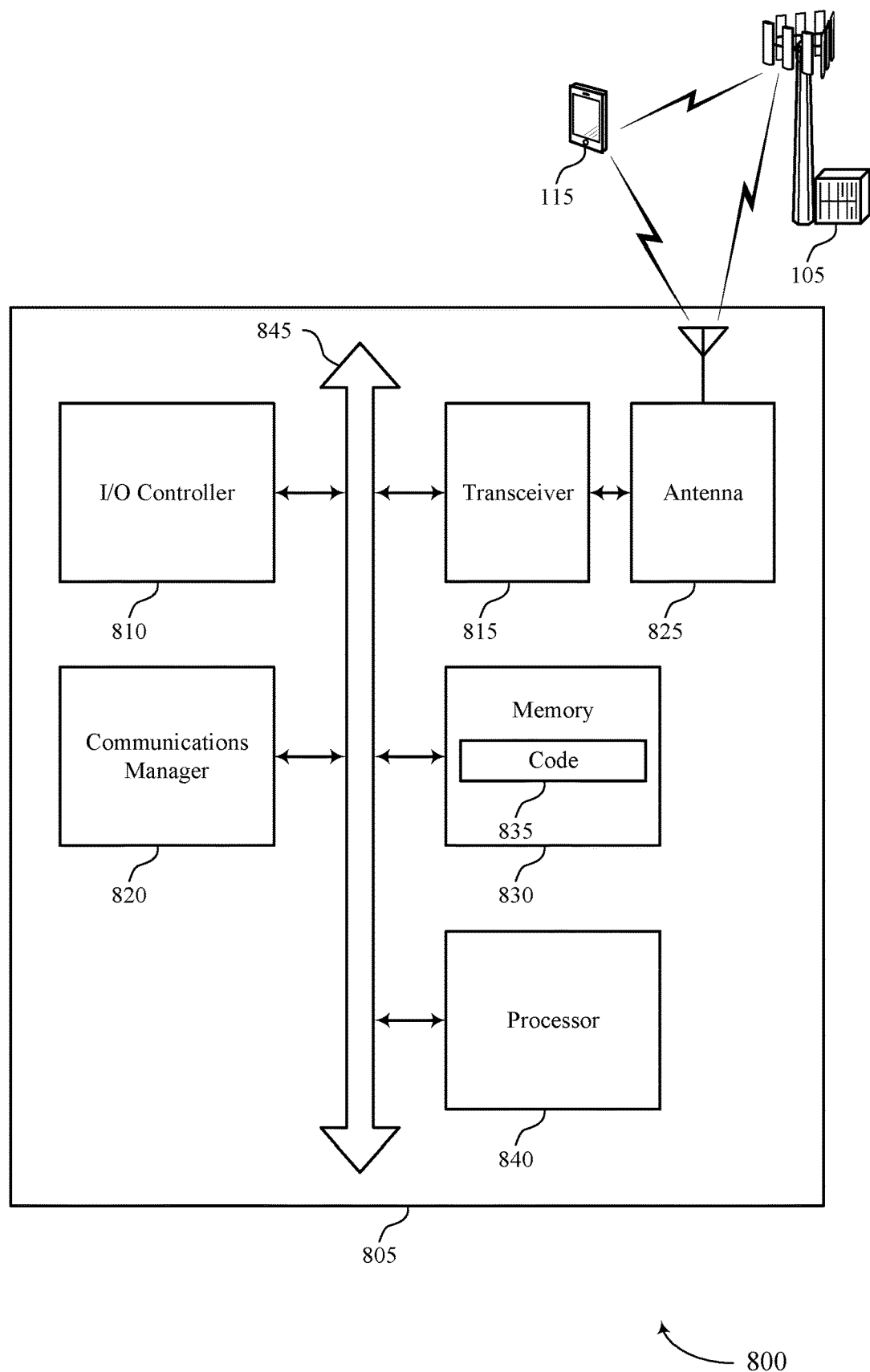
FIG. 8 shows a diagram of a system including a device that supports multiplexing high priority and low priority UCI on a PUSCH in accordance with aspects of the present disclosure.

FIG. 8 shows a diagram of a system 800 including a device 805 that supports multiplexing high priority and low priority UCI on a PUSCH in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting multiplexing high priority and low priority UCI on a PUSCH). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for determining that a first UCI message with a first priority, a second UCI message with a second priority, and an uplink shared channel message overlap, where the first priority is higher than the second priority. The communications manager 820 may be configured as or otherwise support a means for selecting a first set of resources on the PUSCH for the first UCI message based on the first priority. The communications manager 820 may be configured as or otherwise support a means for selecting a second set of resources on the PUSCH for the second UCI message based on the second priority, where the second set of resources is non-overlapping with the first set of resources. The communications manager 820 may be configured as or otherwise support a means for transmitting the first UCI message on the first set of resources and the second UCI message on the second set of resources on the PUSCH.

By including or configuring the communications manager 820 in accordance with examples as described herein, the device 805 may support techniques for an improved utilization of processing capability. For example, a UE 115 may multiplex a low priority UCI transmission with a high priority UCI transmission on a PUSCH with a PUSCH data transmission. This may be a more efficient utilization of UE processing, as the UE 115 may transmit the pending information faster instead of waiting to receive another grant or waiting for a later transmit opportunity. This may free some processing power at the UE 115 at the later times.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of multiplexing high priority and low priority UCI on a PUSCH as described herein, or the processor 840 and the memory 830 may be otherwise configured to perform or support such operations.

Figure 9:
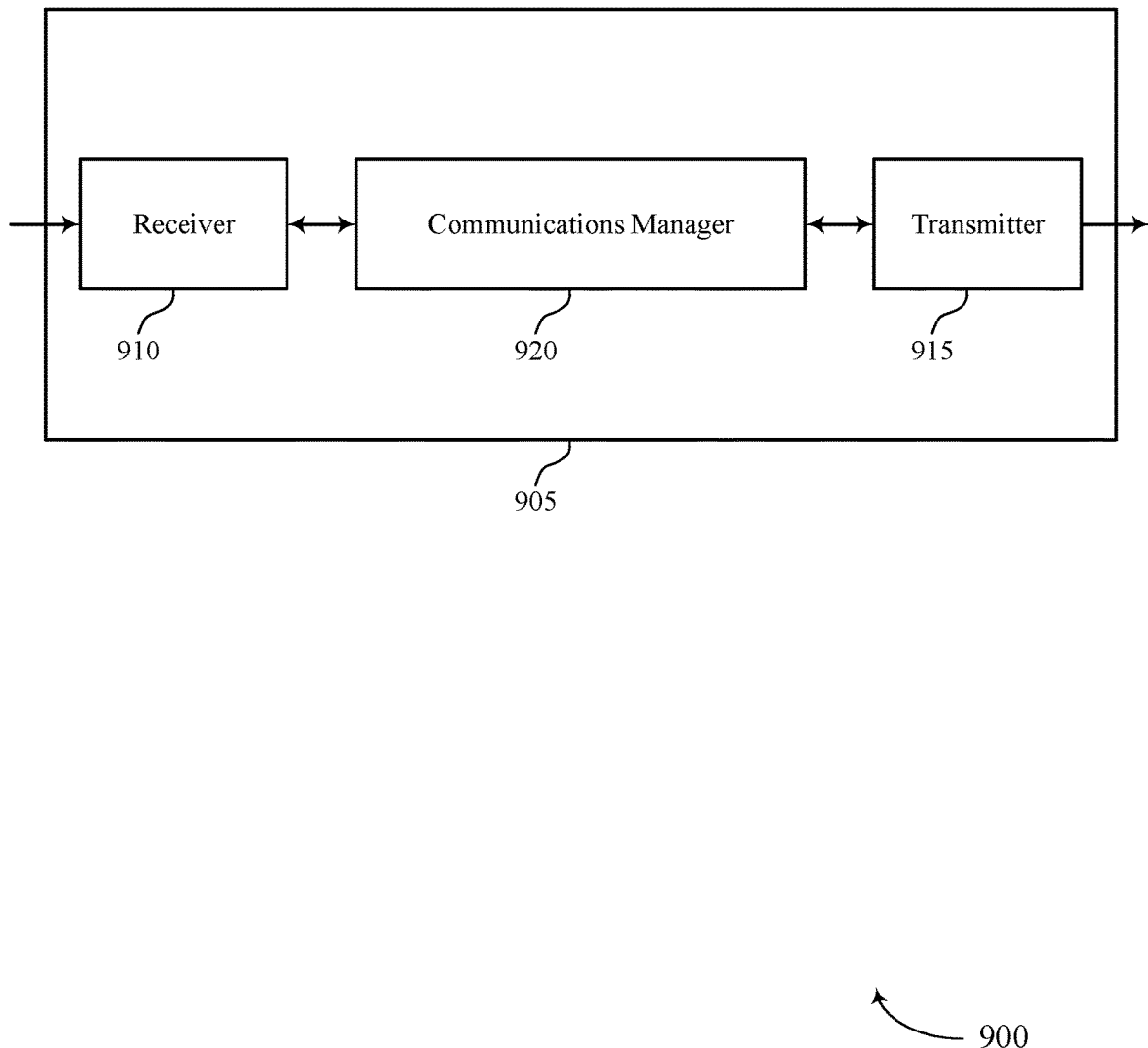
FIGS. 9 and 10 show block diagrams of devices that support multiplexing high priority and low priority UCI on a PUSCH in accordance with aspects of the present disclosure.

FIG. 9 shows a block diagram 900 of a device 905 that supports multiplexing high priority and low priority UCI on a PUSCH in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to multiplexing high priority and low priority UCI on a PUSCH). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to multiplexing high priority and low priority UCI on a PUSCH). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of multiplexing high priority and low priority UCI on a PUSCH as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, at least one processor and memory coupled to the at least one processor may be configured to perform one or more of the functions described herein (e.g., by executing, by the at least one processor, instructions stored in the memory).

Additionally or alternatively, in some examples, the communications manager 920, the receiver 910, the transmitter 915, or various combinations or components thereof may be implemented in code (e.g., as communications management software) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for monitoring a PUSCH for an uplink shared channel message, a first UCI message with a first priority, a second UCI message with a second priority from a UE, where the first priority is higher than the second priority. The communications manager 920 may be configured as or otherwise support a means for identifying a first set of resources on the PUSCH for the first UCI message. The communications manager 920 may be configured as or otherwise support a means for identifying a second set of resources on the PUSCH for the second UCI message, where the first set of resources is non-overlapping with the second set of resources. The communications manager 920 may be configured as or otherwise support a means for decoding the first UCI message on the first set of resources and the second UCI message on the second set of resources on the PUSCH.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient utilization of communication resources. For example, a UE 115 may multiplex a low priority UCI transmission with a high priority UCI transmission and PUSCH data transmission on a PUSCH, increasing an information throughput in a same amount of resources without losing protection for the high priority information.

Figure 10:
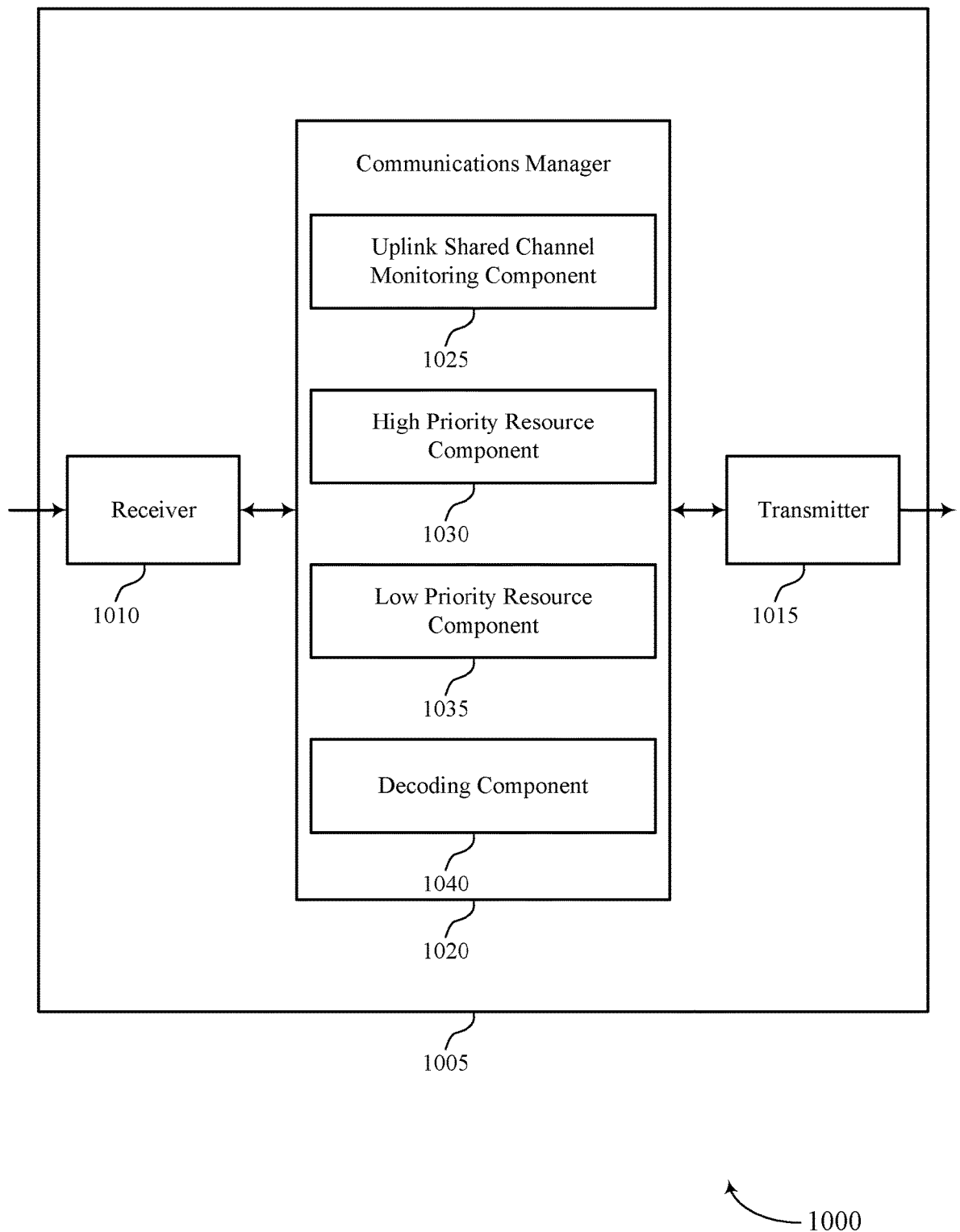

FIG. 10 shows a block diagram 1000 of a device 1005 that supports multiplexing high priority and low priority UCI on a PUSCH in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to multiplexing high priority and low priority UCI on a PUSCH). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to multiplexing high priority and low priority UCI on a PUSCH). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of multiplexing high priority and low priority UCI on a PUSCH as described herein. For example, the communications manager 1020 may include an uplink shared channel monitoring component 1025, a high priority resource component 1030, a low priority resource component 1035, a decoding component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The uplink shared channel monitoring component 1025 may be configured as or otherwise support a means for monitoring a PUSCH for an uplink shared channel message, a first UCI message with a first priority, a second UCI message with a second priority from a UE, where the first priority is higher than the second priority. The high priority resource component 1030 may be configured as or otherwise support a means for identifying a first set of resources on the PUSCH for the first UCI message. The low priority resource component 1035 may be configured as or otherwise support a means for identifying a second set of resources on the PUSCH for the second UCI message, where the first set of resources is non-overlapping with the second set of resources. The decoding component 1040 may be configured as or otherwise support a means for decoding the first UCI message on the first set of resources and the second UCI message on the second set of resources on the PUSCH.

Figure 11:
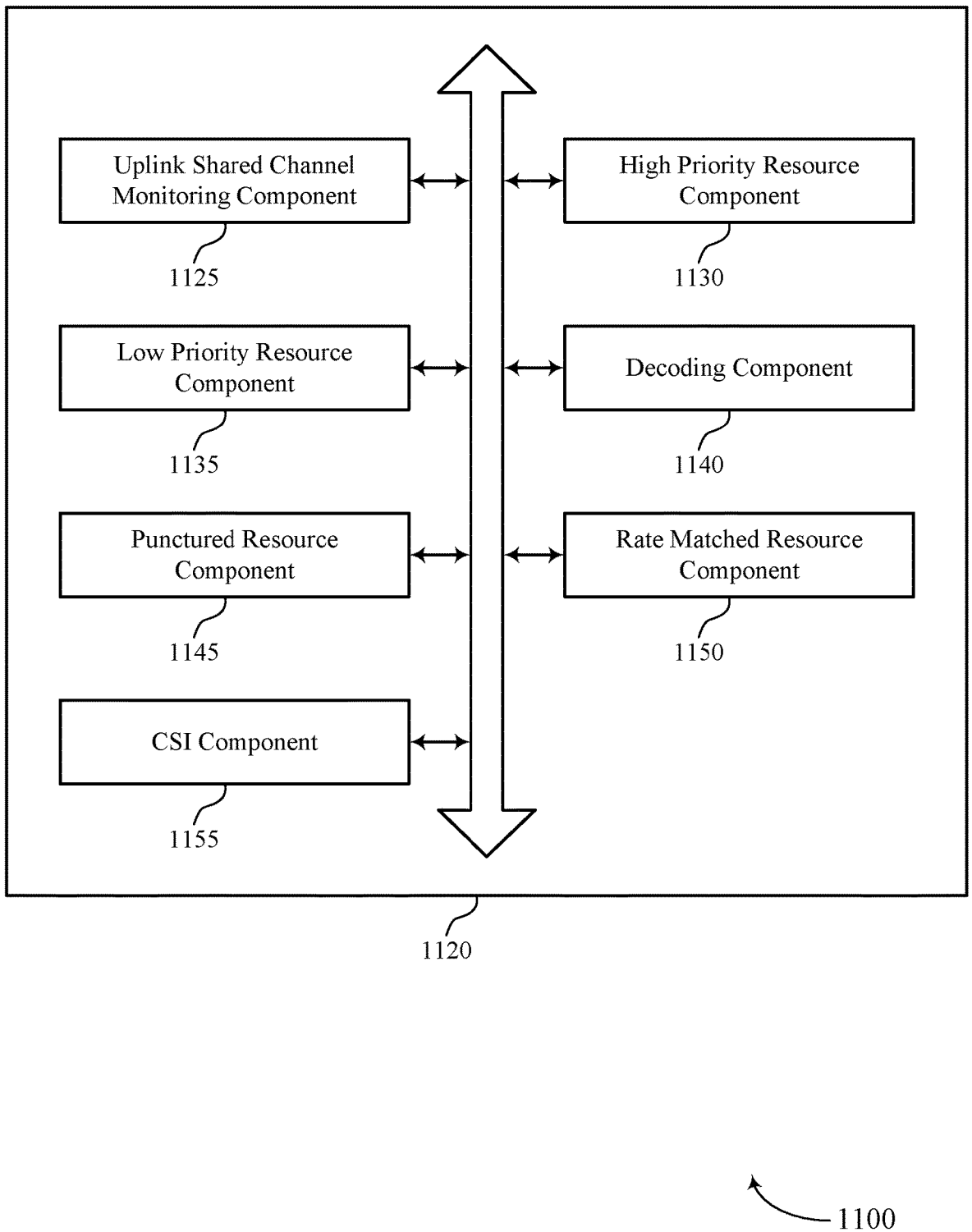
FIG. 11 shows a block diagram of a communications manager that supports multiplexing high priority and low priority UCI on a PUSCH in accordance with aspects of the present disclosure.

FIG. 11 shows a block diagram 1100 of a communications manager 1120 that supports multiplexing high priority and low priority UCI on a PUSCH in accordance with aspects of the present disclosure. The communications manager 1120 may be an example of aspects of a communications manager 920, a communications manager 1020, or both, as described herein. The communications manager 1120, or various components thereof, may be an example of means for performing various aspects of multiplexing high priority and low priority UCI on a PUSCH as described herein. For example, the communications manager 1120 may include an uplink shared channel monitoring component 1125, a high priority resource component 1130, a low priority resource component 1135, a decoding component 1140, a punctured resource component 1145, a rate matched resource component 1150, a CSI component 1155, or any combination thereof. Each of these components may communicate, directly or indirectly, with one another (e.g., via one or more buses).

The communications manager 1120 may support wireless communications at a base station in accordance with examples as disclosed herein. The uplink shared channel monitoring component 1125 may be configured as or otherwise support a means for monitoring a PUSCH for an uplink shared channel message, a first UCI message with a first priority, a second UCI message with a second priority from a UE, where the first priority is higher than the second priority. The high priority resource component 1130 may be configured as or otherwise support a means for identifying a first set of resources on the PUSCH for the first UCI message. The low priority resource component 1135 may be configured as or otherwise support a means for identifying a second set of resources on the PUSCH for the second UCI message, where the first set of resources is non-overlapping with the second set of resources. The decoding component 1140 may be configured as or otherwise support a means for decoding the first UCI message on the first set of resources and the second UCI message on the second set of resources on the PUSCH.

In some examples, the punctured resource component 1145 may be configured as or otherwise support a means for determining that a first payload size of the first UCI message and a second payload size of the second UCI message are each equal to or below a bit size threshold, where the first set of resources and the second set of resources are reserved based on the first payload size and the second payload size being equal to or below the bit size threshold.

In some examples, the first set of resources and the second set of resources are reserved based on an assumption that the first payload and the second payload each include a number of bits equal to the bit size threshold.

In some examples, the punctured resource component 1145 may be configured as or otherwise support a means for determining the PUSCH is punctured by the first UCI message on the first set of resources, where the first UCI message occupies a fourth set of resources contained in the first set of resources. In some examples, the punctured resource component 1145 may be configured as or otherwise support a means for determining the PUSCH is punctured by the second UCI on the second set of resources, where the second UCI occupies a fifth set of resources contained in the second set of resources. In some examples, the fourth set of resources is based on a first actual payload size of the first UCI message, and the fifth set of resources is based on a second actual payload size of the second UCI message.

In some examples, the punctured resource component 1145 may be configured as or otherwise support a means for determining that a first payload size of the first UCI message is equal to or below a bit size threshold, where the first set of resources is reserved for the first UCI message based on the first payload size being equal to or below the bit size threshold. In some examples, the rate matched resource component 1150 may be configured as or otherwise support a means for determining that a second payload size of the second UCI message is above the bit size threshold.

In some examples, the first set of resources is reserved based on an assumption that the first payload includes a number of bits equal to the bit size threshold. In some examples, the third set of resources is non-overlapping with the second set of resources and overlapping with the first set of resources.

In some examples, the punctured resource component 1145 may be configured as or otherwise support a means for determining the PUSCH is punctured by the first UCI message, where the first UCI message occupies a fourth set of resources contained by the first set of resources based on an actual payload size of the first UCI message. In some examples, the uplink shared channel message is rate matched around the second set of resources.

In some examples, the rate matched resource component 1150 may be configured as or otherwise support a means for determining that a first payload size of the first UCI message is above the bit size threshold. In some examples, the punctured resource component 1145 may be configured as or otherwise support a means for determining that a second payload size of the second UCI message is equal to or below a bit size threshold where the second set of resources are reserved for the second UCI message based on the second payload size being equal to or below the bit size threshold.

In some examples, the second set of resources is reserved based on an assumption that the second payload includes a number of bits equal to the bit size threshold. In some examples, the third set of resources is non-overlapping with the first set of resources and overlapping with the second set of resources.

In some examples, the punctured resource component 1145 may be configured as or otherwise support a means for determining the PUSCH is punctured by the second UCI message, where the second UCI message occupies a fourth set of resources contained by the second set of resources based on an actual payload size of the second UCI message. In some examples, the uplink shared channel message is rate matched around the first set of resources.

In some examples, the rate matched resource component 1150 may be configured as or otherwise support a means for determining that a first payload size of the first UCI message and a second payload size of the second UCI message are each above a bit size threshold, where the third set of resources is non-overlapping with the first set of resources and the second set of resources. In some examples, the uplink shared channel message is rate matched around the first set of resources and the second set of resources.

In some examples, the CSI component 1155 may be configured as or otherwise support a means for determining that a CSI transmission overlaps one or more of: the first UCI message, the second UCI message, or the uplink shared channel message.

In some examples, the CSI component 1155 may be configured as or otherwise support a means for determining a quantity of types of uplink control information which overlap the uplink shared channel message exceeds a threshold. In some examples, the CSI component 1155 may be configured as or otherwise support a means for determining that at least a portion of the CSI transmission, a portion of the first uplink control information, or a portion of the second uplink control information message, or any combination thereof, is dropped by the UE based on the quantity exceeding the threshold.

In some examples, the CSI component 1155 may be configured as or otherwise support a means for transmitting, to the UE, an indication of the threshold via DCI, a MAC CE, or RRC signaling. In some cases, the threshold may be two types of UCI or three types of UCI.

In some examples, the CSI transmission is an aperiodic CSI transmission associated with the physical uplink shared channel, a semi-persistent CSI transmission associated with the physical uplink shared channel, a semi-persistent CSI transmission associated with a physical uplink control channel, or a periodic CSI transmission associated with the physical uplink control channel.

In some examples, the CSI component 1155 may be configured as or otherwise support a means for determining the CSI transmission has a higher priority than the second uplink control information and a lower priority than the first uplink control information. In some examples, the CSI component 1155 may be configured as or otherwise support a means for dropping the second uplink control information. In some examples, the CSI component 1155 may be configured as or otherwise support a means for transmitting the first uplink control information on the first set of resources and the CSI transmission on a fourth set of resources. For example, the CSI transmission may have a higher priority than the second UCI and a lower priority than the first UCI, and the UE 115 may drop the second UCI and transmit the CSI and the first UCI.

In some examples, the CSI component 1155 may be configured as or otherwise support a means for determining that a first portion of the CSI transmission has a lower priority than the uplink shared channel message, where the first portion of the CSI transmission is dropped by the UE.

In some examples, the CSI component 1155 may be configured as or otherwise support a means for determining a fourth set of resources on the PUSCH for a second portion of the CSI transmission having a same or higher priority than the uplink shared channel message. In some examples, the CSI component 1155 may be configured as or otherwise support a means for receiving the second portion of the CSI transmission with the higher priority on the fourth set of resources.

In some examples, the CSI component 1155 may be configured as or otherwise support a means for determining a fourth set of resources on the PUSCH for at least a first portion of the CSI transmission. In some examples, the CSI component 1155 may be configured as or otherwise support a means for receiving the first portion of the CSI transmission on the fourth set of resources. In some examples, the first portion of the CSI transmission is rate matched around the first set of resources and the second set of resources.

In some examples, the first portion of the CSI transmission is rate matched around the first set of resources and the second set of resources. In some examples, one or more of the first set of resources or the second set of resources puncture at least a portion of a fifth set of resources for a second portion of the CSI transmission. In some examples, one or more of the first UCI message or the second UCI message include acknowledgment feedback.

Figure 12:
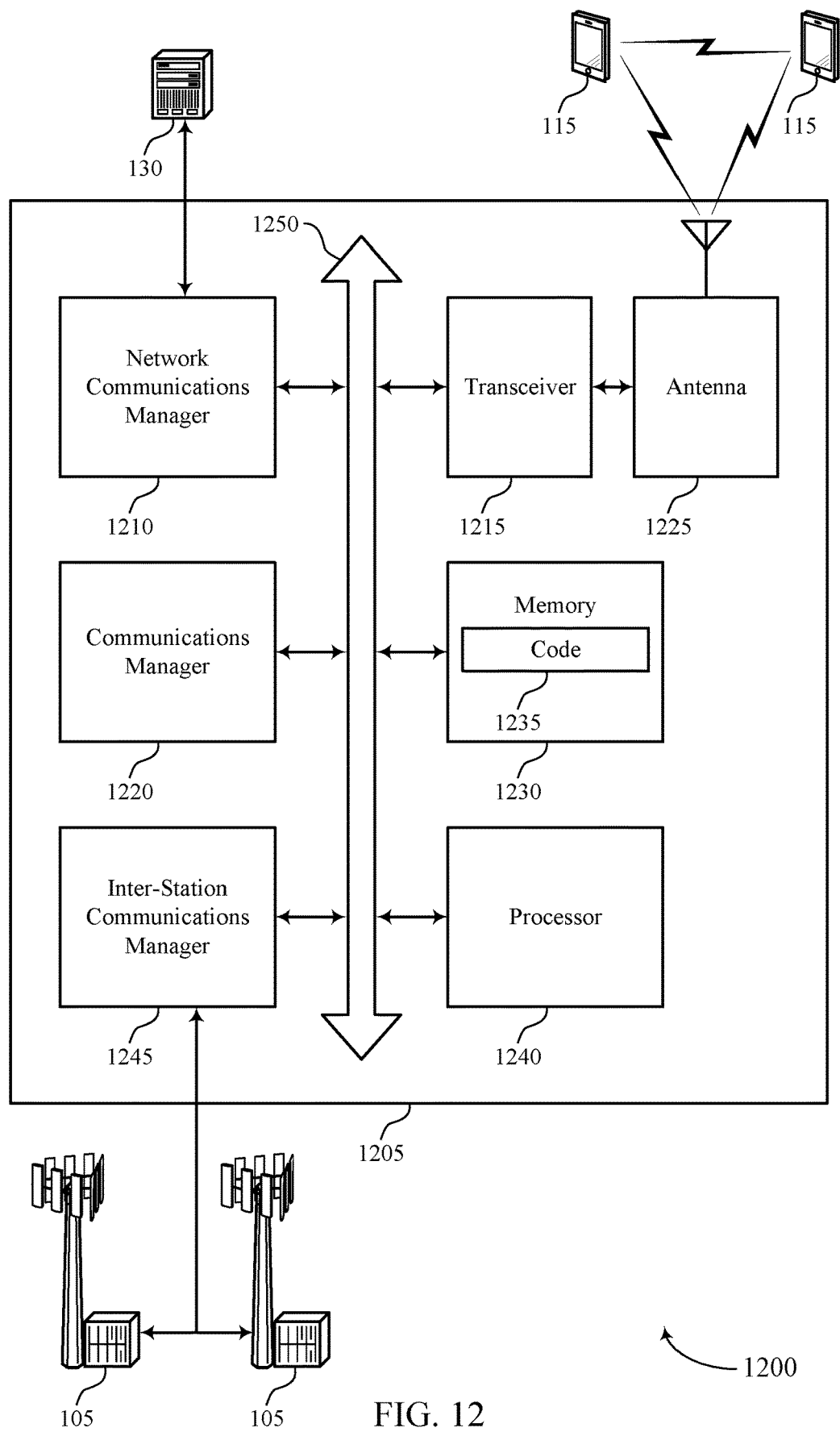
FIG. 12 shows a diagram of a system including a device that supports multiplexing high priority and low priority UCI on a PUSCH in accordance with aspects of the present disclosure.

FIG. 12 shows a diagram of a system 1200 including a device 1205 that supports multiplexing high priority and low priority UCI on a PUSCH in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting multiplexing high priority and low priority UCI on a PUSCH). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for monitoring a PUSCH for an uplink shared channel message, a first UCI message with a first priority, a second UCI message with a second priority from a UE, where the first priority is higher than the second priority. The communications manager 1220 may be configured as or otherwise support a means for identifying a first set of resources on the PUSCH for the first UCI message. The communications manager 1220 may be configured as or otherwise support a means for identifying a second set of resources on the PUSCH for the second UCI message, where the first set of resources is non-overlapping with the second set of resources. The communications manager 1220 may be configured as or otherwise support a means for decoding the first UCI message on the first set of resources and the second UCI message on the second set of resources on the PUSCH.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of multiplexing high priority and low priority UCI on a PUSCH as described herein, or the processor 1240 and the memory 1230 may be otherwise configured to perform or support such operations.

Figure 13:
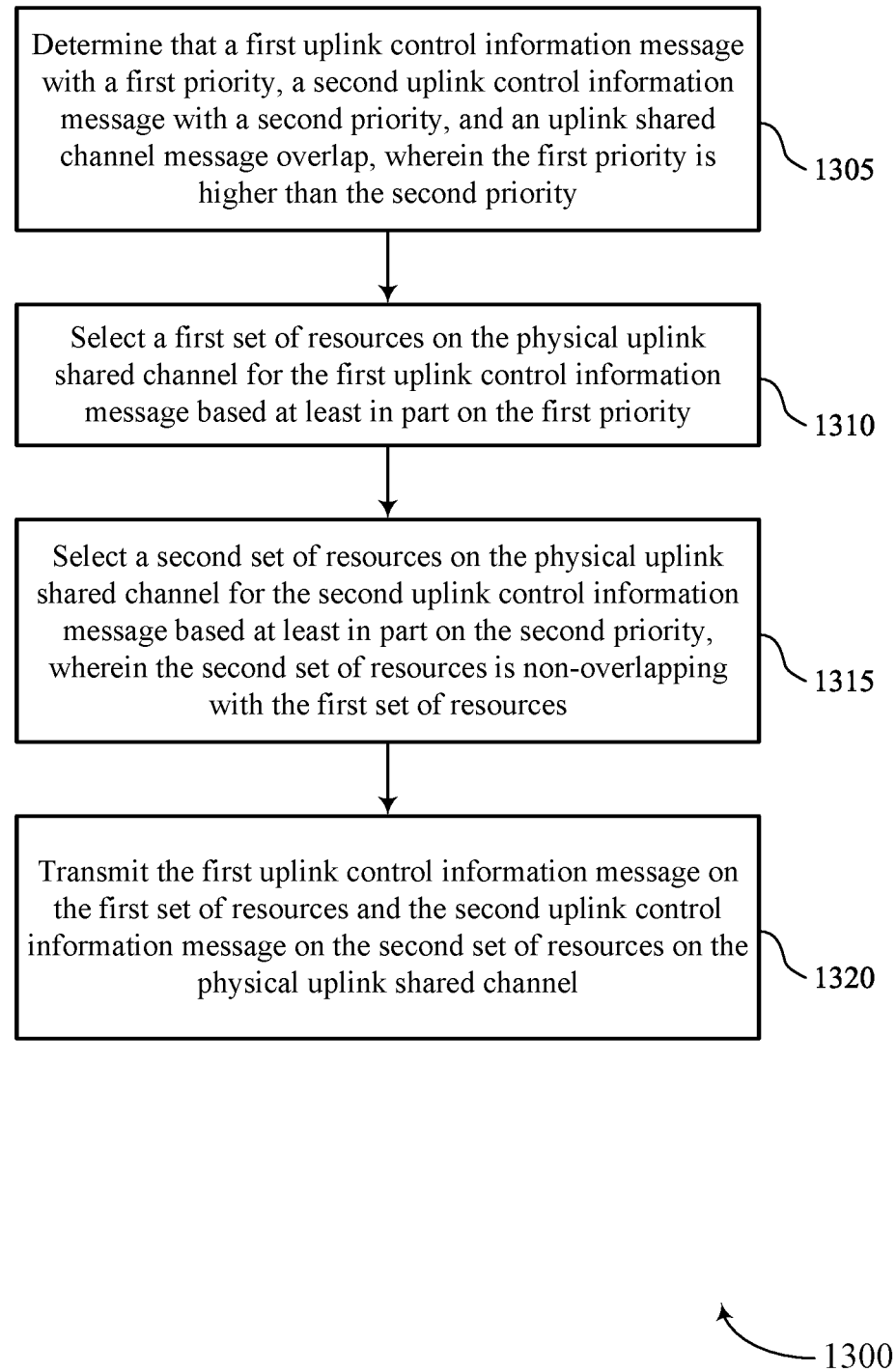
FIGS. 13 through 19 show flowcharts illustrating methods that support multiplexing high priority and low priority UCI on a PUSCH in accordance with aspects of the present disclosure.

FIG. 13 shows a flowchart illustrating a method 1300 that supports multiplexing high priority and low priority UCI on a PUSCH in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include determining that a first UCI message with a first priority, a second UCI message with a second priority, and an uplink shared channel message overlap, where the first priority is higher than the second priority. The operations of 1305 may be performed in accordance with examples as disclosed herein. In some examples, aspects of the operations of 1305 may be performed by an overlap detection component 725 as described with reference to FIG. 7.

At 1310, the method may include selecting a first set of resources on the PUSCH for the first UCI message based on the first priority. The operations of 1310 may be performed in accordance with examples as disclosed herein. In some examples, aspects of the operations of 1310 may be performed by a high priority resource selection component 730 as described with reference to FIG. 7.

At 1315, the method may include selecting a second set of resources on the PUSCH for the second UCI message based on the second priority, where the second set of resources is non-overlapping with the first set of resources. The operations of 1315 may be performed in accordance with examples as disclosed herein. In some examples, aspects of the operations of 1315 may be performed by a low priority resource selection component 735 as described with reference to FIG. 7.

At 1320, the method may include transmitting the first UCI message on the first set of resources and the second UCI message on the second set of resources on the PUSCH. The operations of 1320 may be performed in accordance with examples as disclosed herein. In some examples, aspects of the operations of 1320 may be performed by a multiplexed message transmitting component 740 as described with reference to FIG. 7.

Figure 14:
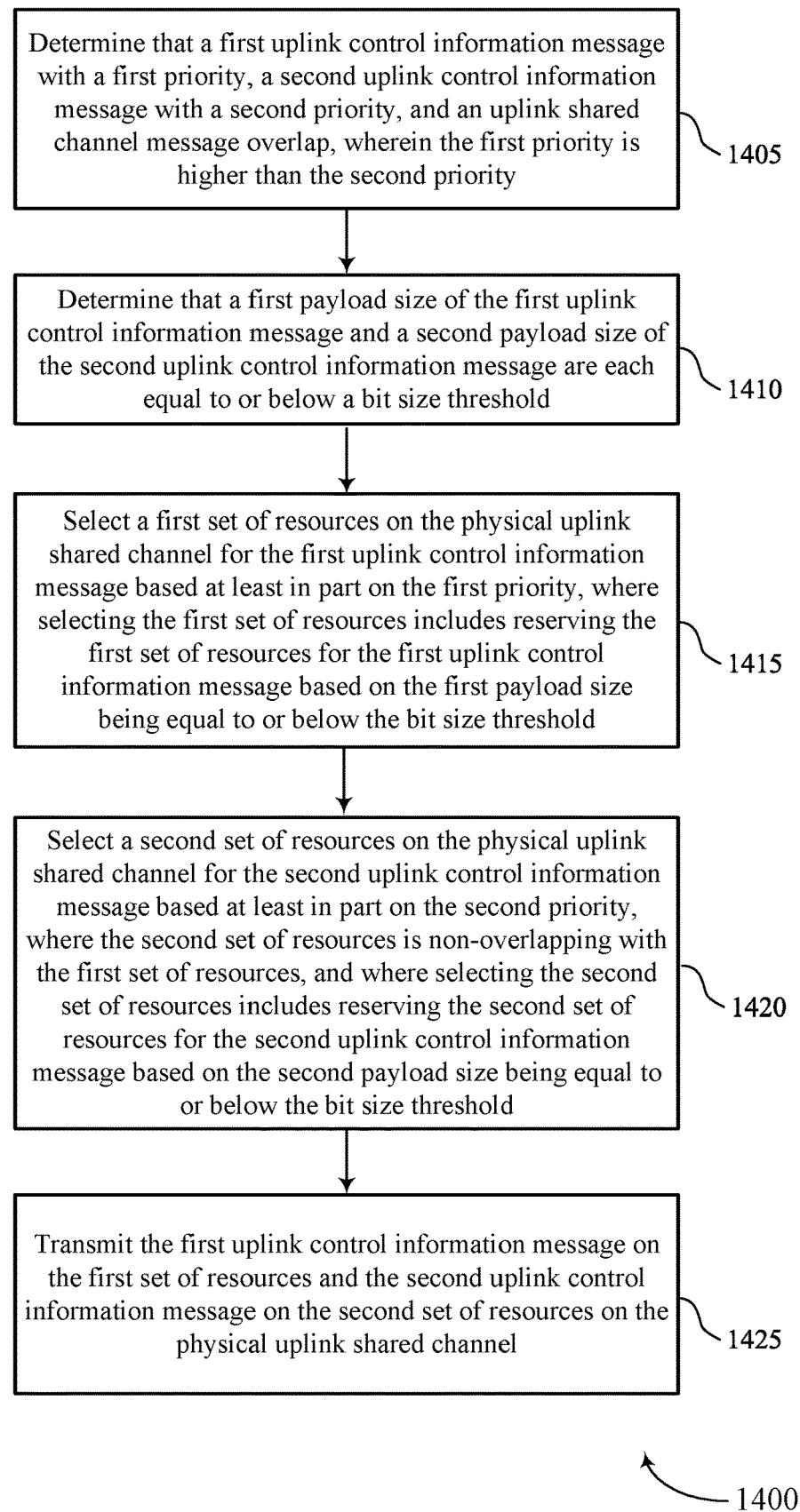

FIG. 14 shows a flowchart illustrating a method 1400 that supports multiplexing high priority and low priority UCI on a PUSCH in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include determining that a first UCI message with a first priority, a second UCI message with a second priority, and an uplink shared channel message overlap, where the first priority is higher than the second priority. The operations of 1405 may be performed in accordance with examples as disclosed herein. In some examples, aspects of the operations of 1405 may be performed by an overlap detection component 725 as described with reference to FIG. 7.

At 1410, the method may include determining that a first payload size of the first UCI message and a second payload size of the second UCI message are each equal to or below a bit size threshold, where selecting the first set of resources and selecting the second set of resources includes reserving the first set of resources for the first UCI message and the second set of resources for the second UCI message based on the first payload size and the second payload size being equal to or below the bit size threshold. The operations of 1410 may be performed in accordance with examples as disclosed herein. In some examples, aspects of the operations of 1410 may be performed by a resource puncturing component 745 as described with reference to FIG. 7.

At 1415, the method may include selecting a first set of resources on the PUSCH for the first UCI message based on the first priority. The operations of 1415 may be performed in accordance with examples as disclosed herein. In some examples, aspects of the operations of 1415 may be performed by a high priority resource selection component 730 as described with reference to FIG. 7.

At 1420, the method may include selecting a second set of resources on the PUSCH for the second UCI message based on the second priority, where the second set of resources is non-overlapping with the first set of resources. The operations of 1420 may be performed in accordance with examples as disclosed herein. In some examples, aspects of the operations of 1420 may be performed by a low priority resource selection component 735 as described with reference to FIG. 7.

At 1425, the method may include transmitting the first UCI message on the first set of resources and the second UCI message on the second set of resources on the PUSCH. The operations of 1425 may be performed in accordance with examples as disclosed herein. In some examples, aspects of the operations of 1425 may be performed by a multiplexed message transmitting component 740 as described with reference to FIG. 7.

Figure 15:
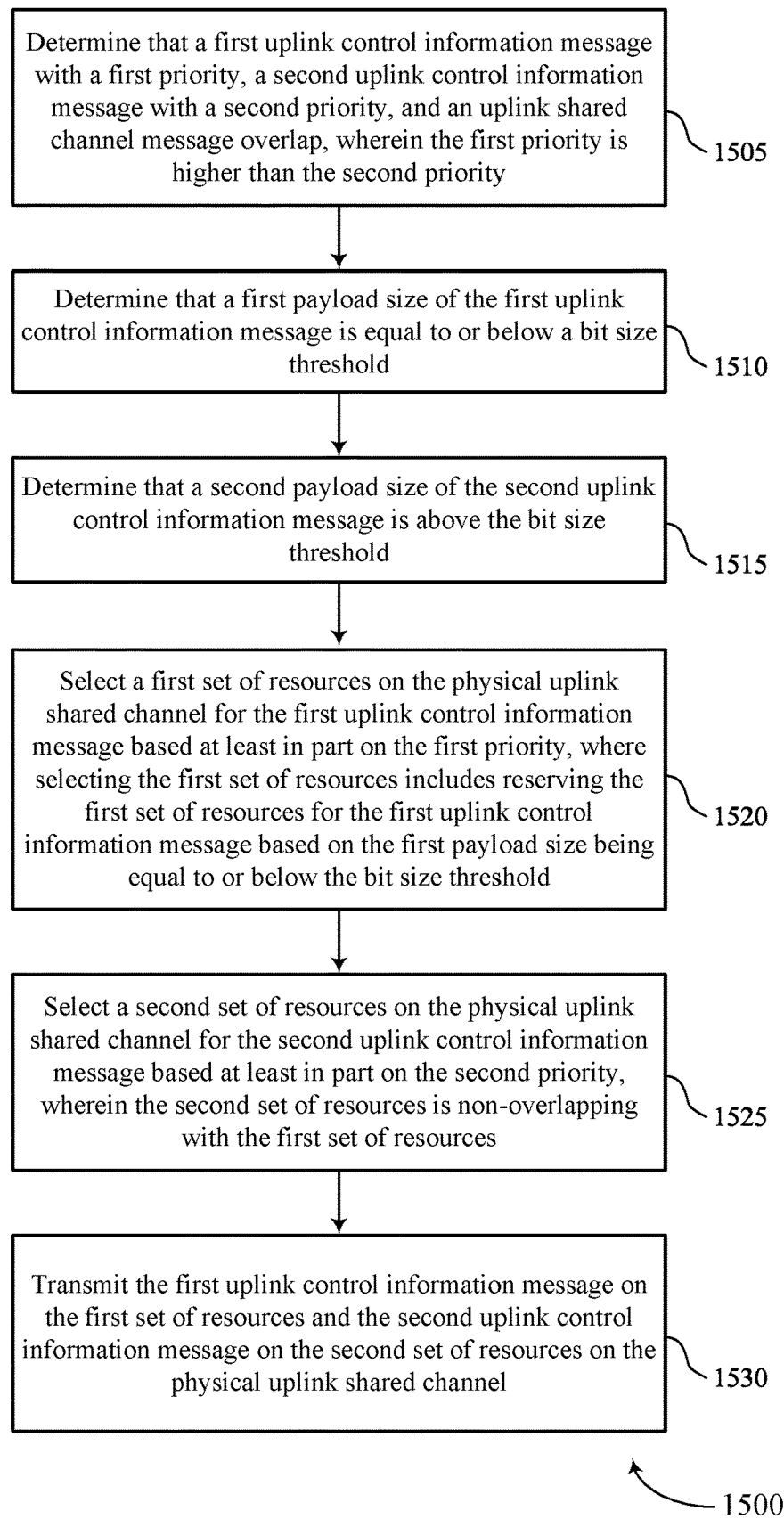

FIG. 15 shows a flowchart illustrating a method 1500 that supports multiplexing high priority and low priority UCI on a PUSCH in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include determining that a first UCI message with a first priority, a second UCI message with a second priority, and an uplink shared channel message overlap, where the first priority is higher than the second priority. The operations of 1505 may be performed in accordance with examples as disclosed herein. In some examples, aspects of the operations of 1505 may be performed by an overlap detection component 725 as described with reference to FIG. 7.

At 1510, the method may include determining that a first payload size of the first UCI message is equal to or below a bit size threshold, where selecting the first set of resources includes reserving the first set of resources for the first UCI message based on the first payload size being equal to or below the bit size threshold. The operations of 1510 may be performed in accordance with examples as disclosed herein. In some examples, aspects of the operations of 1510 may be performed by a resource puncturing component 745 as described with reference to FIG. 7.

At 1515, the method may include determining that a second payload size of the second UCI message is above the bit size threshold. The operations of 1515 may be performed in accordance with examples as disclosed herein. In some examples, aspects of the operations of 1515 may be performed by a rate matching component 750 as described with reference to FIG. 7.

At 1520, the method may include selecting a first set of resources on the PUSCH for the first UCI message based on the first priority. The operations of 1520 may be performed in accordance with examples as disclosed herein. In some examples, aspects of the operations of 1520 may be performed by a high priority resource selection component 730 as described with reference to FIG. 7.

At 1525, the method may include selecting a second set of resources on the PUSCH for the second UCI message based on the second priority, where the second set of resources is non-overlapping with the first set of resources. The operations of 1525 may be performed in accordance with examples as disclosed herein. In some examples, aspects of the operations of 1525 may be performed by a low priority resource selection component 735 as described with reference to FIG. 7.

At 1530, the method may include transmitting the first UCI message on the first set of resources and the second UCI message on the second set of resources on the PUSCH. The operations of 1530 may be performed in accordance with examples as disclosed herein. In some examples, aspects of the operations of 1530 may be performed by a multiplexed message transmitting component 740 as described with reference to FIG. 7.

Figure 16:
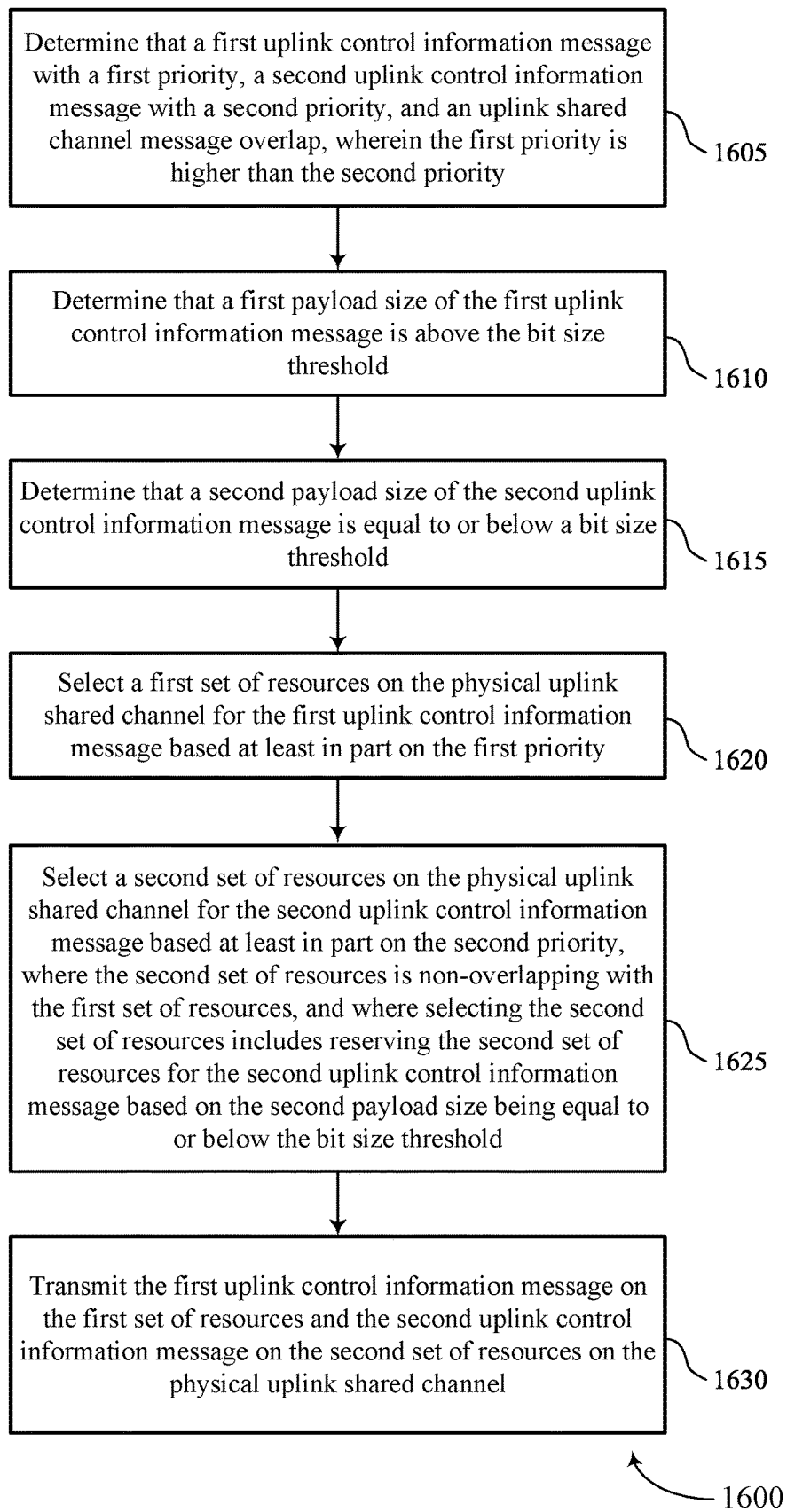

FIG. 16 shows a flowchart illustrating a method 1600 that supports multiplexing high priority and low priority UCI on a PUSCH in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include determining that a first UCI message with a first priority, a second UCI message with a second priority, and an uplink shared channel message overlap, where the first priority is higher than the second priority. The operations of 1605 may be performed in accordance with examples as disclosed herein. In some examples, aspects of the operations of 1605 may be performed by an overlap detection component 725 as described with reference to FIG. 7.

At 1610, the method may include determining that a first payload size of the first UCI message is above the bit size threshold. The operations of 1610 may be performed in accordance with examples as disclosed herein. In some examples, aspects of the operations of 1610 may be performed by a rate matching component 750 as described with reference to FIG. 7.

At 1615, the method may include determining that a second payload size of the second UCI message is equal to or below a bit size threshold, where selecting the second set of resources includes reserving the second set of resources for the second UCI message based on the second payload size being equal to or below the bit size threshold. The operations of 1615 may be performed in accordance with examples as disclosed herein. In some examples, aspects of the operations of 1615 may be performed by a resource puncturing component 745 as described with reference to FIG. 7.

At 1620, the method may include selecting a first set of resources on the PUSCH for the first UCI message based on the first priority. The operations of 1620 may be performed in accordance with examples as disclosed herein. In some examples, aspects of the operations of 1620 may be performed by a high priority resource selection component 730 as described with reference to FIG. 7.

At 1625, the method may include selecting a second set of resources on the PUSCH for the second UCI message based on the second priority, where the second set of resources is non-overlapping with the first set of resources. The operations of 1625 may be performed in accordance with examples as disclosed herein. In some examples, aspects of the operations of 1625 may be performed by a low priority resource selection component 735 as described with reference to FIG. 7.

At 1630, the method may include transmitting the first UCI message on the first set of resources and the second UCI message on the second set of resources on the PUSCH. The operations of 1630 may be performed in accordance with examples as disclosed herein. In some examples, aspects of the operations of 1630 may be performed by a multiplexed message transmitting component 740 as described with reference to FIG. 7.

Figure 17:
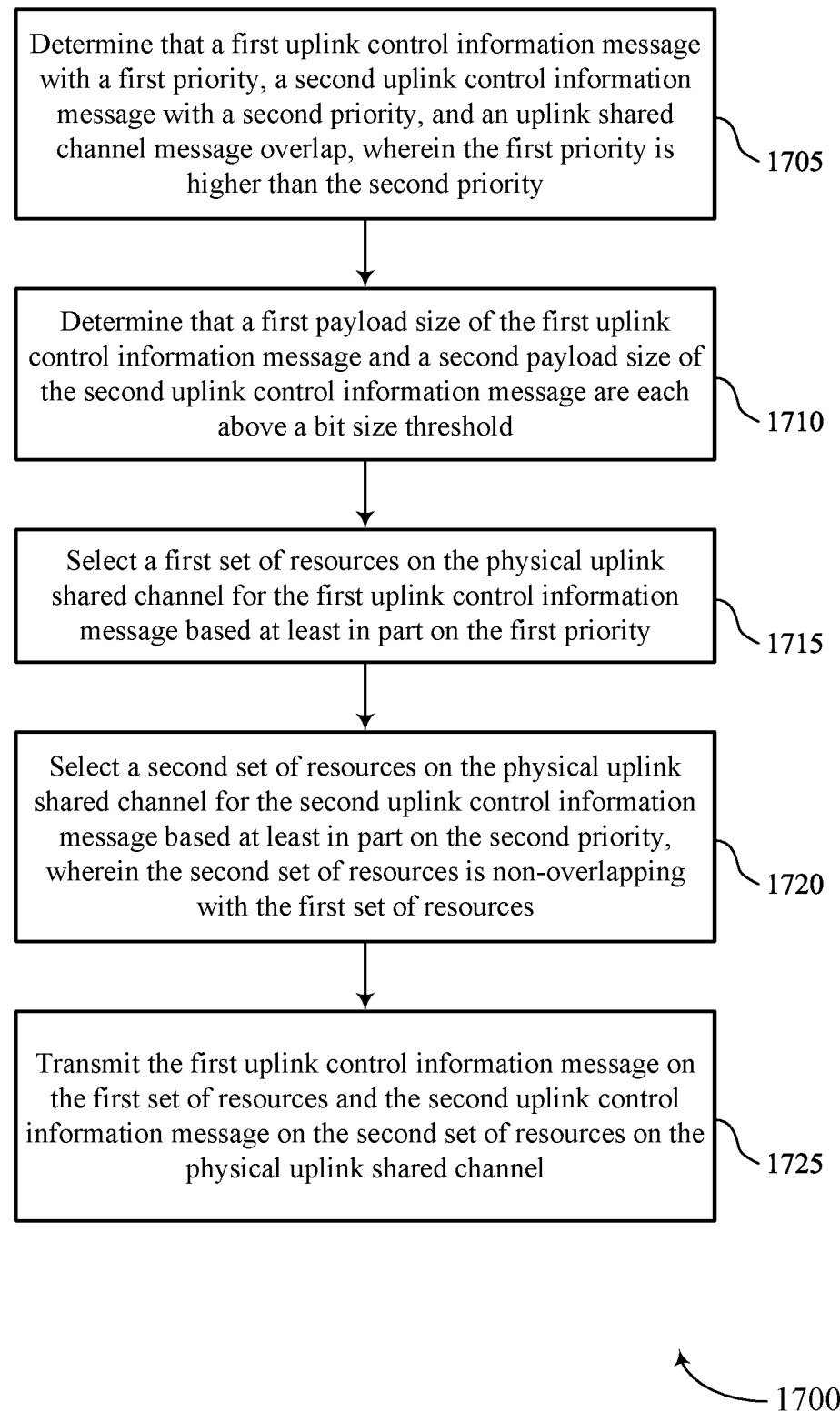

FIG. 17 shows a flowchart illustrating a method 1700 that supports multiplexing high priority and low priority UCI on a PUSCH in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include determining that a first UCI message with a first priority, a second UCI message with a second priority, and an uplink shared channel message overlap, where the first priority is higher than the second priority. The operations of 1705 may be performed in accordance with examples as disclosed herein. In some examples, aspects of the operations of 1705 may be performed by an overlap detection component 725 as described with reference to FIG. 7.

At 1710, the method may include determining that a first payload size of the first UCI message and a second payload size of the second UCI message are each above a bit size threshold. The operations of 1710 may be performed in accordance with examples as disclosed herein. In some examples, aspects of the operations of 1710 may be performed by a rate matching component 750 as described with reference to FIG. 7.

At 1715, the method may include selecting a first set of resources on the PUSCH for the first UCI message based on the first priority. The operations of 1715 may be performed in accordance with examples as disclosed herein. In some examples, aspects of the operations of 1715 may be performed by a high priority resource selection component 730 as described with reference to FIG. 7.

At 1720, the method may include selecting a second set of resources on the PUSCH for the second UCI message based on the second priority, where the second set of resources is non-overlapping with the first set of resources. The operations of 1720 may be performed in accordance with examples as disclosed herein. In some examples, aspects of the operations of 1720 may be performed by a low priority resource selection component 735 as described with reference to FIG. 7.

At 1725, the method may include transmitting the first UCI message on the first set of resources and the second UCI message on the second set of resources on the PUSCH. The operations of 1725 may be performed in accordance with examples as disclosed herein. In some examples, aspects of the operations of 1725 may be performed by a multiplexed message transmitting component 740 as described with reference to FIG. 7.

Figure 18:
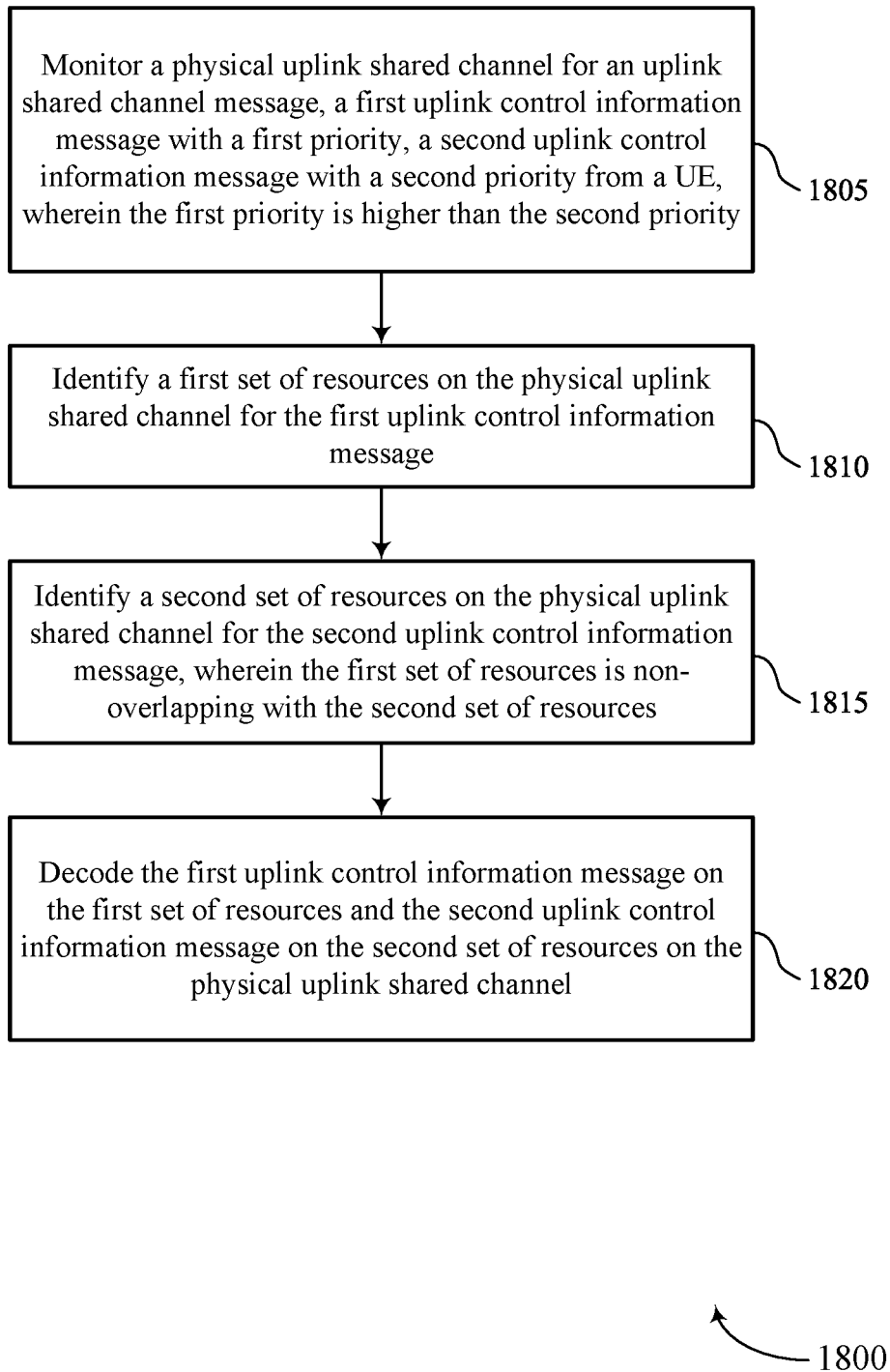

FIG. 18 shows a flowchart illustrating a method 1800 that supports multiplexing high priority and low priority UCI on a PUSCH in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include monitoring a PUSCH for an uplink shared channel message, a first UCI message with a first priority, a second UCI message with a second priority from a UE, where the first priority is higher than the second priority. The operations of 1805 may be performed in accordance with examples as disclosed herein. In some examples, aspects of the operations of 1805 may be performed by an uplink shared channel monitoring component 1125 as described with reference to FIG. 11.

At 1810, the method may include identifying a first set of resources on the PUSCH for the first UCI message. The operations of 1810 may be performed in accordance with examples as disclosed herein. In some examples, aspects of the operations of 1810 may be performed by a high priority resource component 1130 as described with reference to FIG. 11.

At 1815, the method may include identifying a second set of resources on the PUSCH for the second UCI message, where the first set of resources is non-overlapping with the second set of resources. The operations of 1815 may be performed in accordance with examples as disclosed herein. In some examples, aspects of the operations of 1815 may be performed by a low priority resource component 1135 as described with reference to FIG. 11.

At 1820, the method may include decoding the first UCI message on the first set of resources and the second UCI message on the second set of resources on the PUSCH. The operations of 1820 may be performed in accordance with examples as disclosed herein. In some examples, aspects of the operations of 1820 may be performed by a decoding component 1140 as described with reference to FIG. 11.

Figure 19:
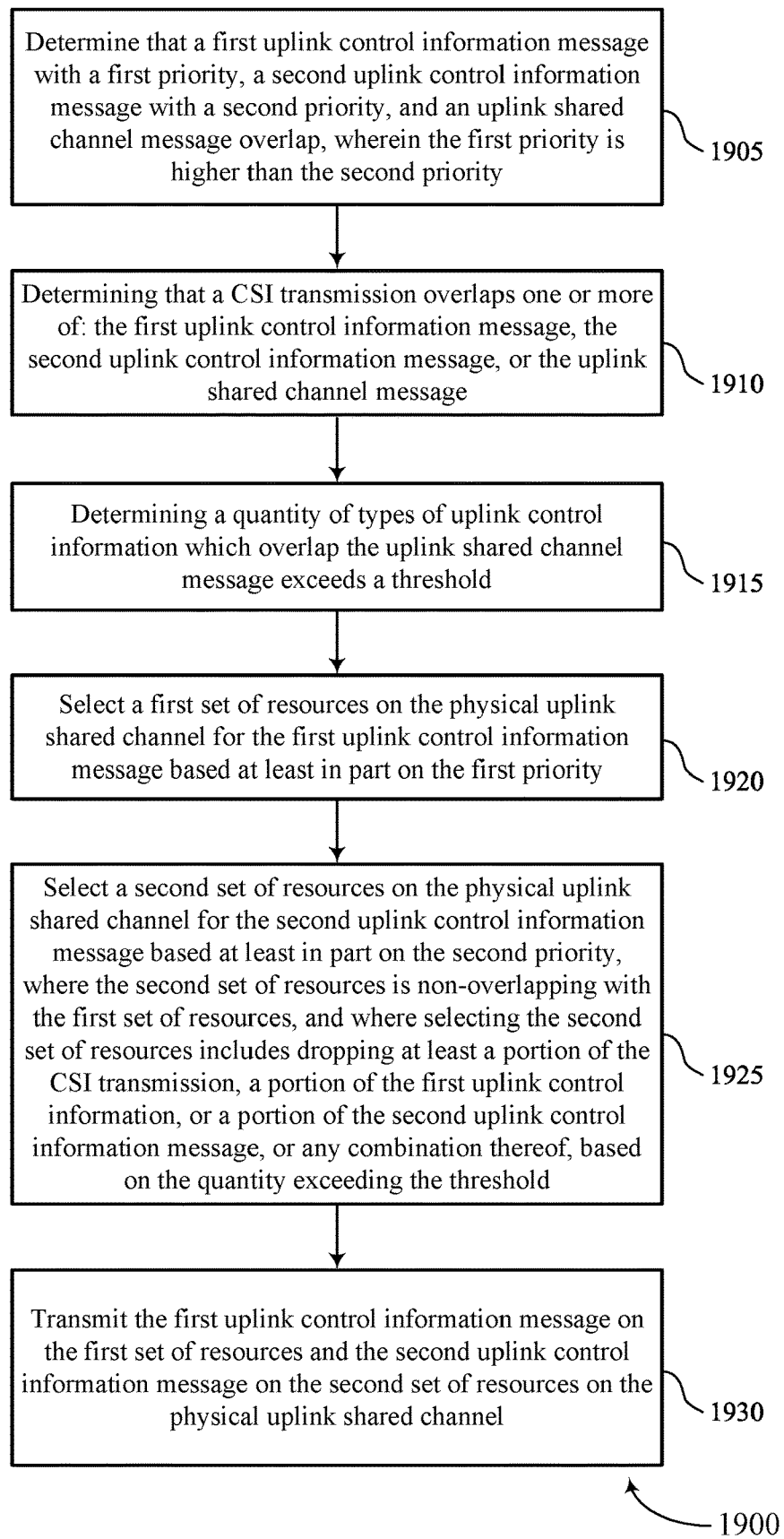

FIG. 19 shows a flowchart illustrating a method 1900 that supports multiplexing high priority and low priority UCI on a PUSCH in accordance with aspects of the present disclosure. The operations of the method 1900 may be implemented by a UE or its components as described herein. For example, the operations of the method 1900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1905, the method may include determining that a first UCI message with a first priority, a second UCI message with a second priority, and an uplink shared channel message overlap, where the first priority is higher than the second priority. The operations of 1905 may be performed in accordance with examples as disclosed herein. In some examples, aspects of the operations of 1905 may be performed by an overlap detection component 725 as described with reference to FIG. 7.

At 1910, the method may include determining that that a CSI transmission overlaps one or more of: the first uplink control information message, the second uplink control information message, or the uplink shared channel message. The operations of 1910 may be performed in accordance with examples as disclosed herein. In some examples, aspects of the operations of 1910 may be performed by a CSI component 755 as described with reference to FIG. 7.

At 1915, the method may include determining that a quantity of types of uplink control information which overlap the uplink shared channel message exceeds a threshold. The operations of 1915 may be performed in accordance with examples as disclosed herein. In some examples, aspects of the operations of 1915 may be performed by a resource puncturing component 745 as described with reference to FIG. 7.

At 1920, the method may include selecting a first set of resources on the PUSCH for the first UCI message based on the first priority. In some cases, selecting the first set of resources may include dropping at least a portion of the CSI transmission, a portion of the first uplink control information, or a portion of the second uplink control information message, or any combination thereof, based on the quantity exceeding the threshold. The operations of 1920 may be performed in accordance with examples as disclosed herein. In some examples, aspects of the operations of 1920 may be performed by a high priority resource selection component 730 or a CSI component 755, or both, as described with reference to FIG. 7.

At 1925, the method may include selecting a second set of resources on the PUSCH for the second UCI message based on the second priority, where the second set of resources is non-overlapping with the first set of resources. In some cases, selecting the second set of resources may include dropping at least a portion of the CSI transmission, a portion of the first uplink control information, or a portion of the second uplink control information message, or any combination thereof, based on the quantity exceeding the threshold. The operations of 1925 may be performed in accordance with examples as disclosed herein. In some examples, aspects of the operations of 1925 may be performed by a low priority resource selection component 735 or a CSI component 755, or both, as described with reference to FIG. 7.

At 1930, the method may include transmitting the first UCI message on the first set of resources and the second UCI message on the second set of resources on the PUSCH. The operations of 1930 may be performed in accordance with examples as disclosed herein. In some examples, aspects of the operations of 1930 may be performed by a multiplexed message transmitting component 740 as described with reference to FIG. 7.

The following provides an overview of aspects of the present disclosure:

Aspect 1: A method for wireless communications at a UE, comprising: determining that a first uplink control information message with a first priority, a second uplink control information message with a second priority, and an uplink shared channel message overlap, wherein the first priority is higher than the second priority; selecting a first set of resources on the physical uplink shared channel for the first uplink control information message based at least in part on the first priority; selecting a second set of resources on the physical uplink shared channel for the second uplink control information message based at least in part on the second priority, wherein the second set of resources is non-overlapping with the first set of resources; and transmitting the first uplink control information message on the first set of resources, the second uplink control information message on the second set of resources, and the uplink shared channel message on a third set of resources on the physical uplink shared channel.

Aspect 2: The method of aspect 1, further comprising: determining that a first payload size of the first uplink control information message and a second payload size of the second uplink control information message are each equal to or below a bit size threshold, wherein selecting the first set of resources and selecting the second set of resources comprises reserving the first set of resources for the first uplink control information message and the second set of resources for the second uplink control information message based at least in part on the first payload size and the second payload size being equal to or below the bit size threshold.

Aspect 3: The method of aspect 2, wherein reserving the first set of resources and the second set of resources comprises: reserving the first set of resources and the second set of resources based at least in part on an assumption that the first payload and the second payload each comprise a number of bits equal to the bit size threshold.

Aspect 4: The method of any of aspects 2 through 3, wherein selecting the first set of resources and selecting the second set of resources comprises: puncturing the physical uplink shared channel with the first uplink control information message on the first set of resources, wherein the first uplink control information message occupies a fourth set of resources contained in the first set of resources; and puncturing the physical uplink shared channel with the second uplink control information on the second set of resources, wherein the second uplink control information occupies a fifth set of resources contained in the second set of resources.

Aspect 5: The method of aspect 4, wherein the fourth set of resources is determined based at least in part on a first actual payload size of the first uplink control information message, and the fifth set of resources is determined based at least in part on a second actual payload size of the second uplink control information message.

Aspect 6: The method of any of aspects 4 through 5, wherein the bit size threshold is two bits.

Aspect 7: The method of any of aspects 2 through 6, wherein the third set of resources at least partially overlaps one or more of the first set of resources or the second set of resources.

Aspect 8: The method of aspect 1, further comprising: determining that a first payload size of the first uplink control information message is equal to or below a bit size threshold, wherein selecting the first set of resources comprises reserving the first set of resources for the first uplink control information message based at least in part on the first payload size being equal to or below the bit size threshold; and determining that a second payload size of the second uplink control information message is above the bit size threshold.

Aspect 9: The method of aspect 8, wherein reserving the first set of resources comprises: reserving the first set of resources based at least in part on an assumption that the first payload comprises a number of bits equal to the bit size threshold.

Aspect 10: The method of any of aspects 8 through 9, further comprising: selecting the third set of resources, wherein the third set of resources is non-overlapping with the second set of resources and overlapping with the first set of resources.

Aspect 11: The method of any of aspects 8 through 10, wherein selecting the first set of resources comprises: puncturing the physical uplink shared channel with the first uplink control information message, wherein the first uplink control information message occupies a fourth set of resources contained by the first set of resources, and wherein the fourth set of resources is determined based at least in part on an actual payload size of the first uplink control information message.

Aspect 12: The method of any of aspects 8 through 11, further comprising: rate matching the uplink shared channel message around the second set of resources based at least in part on selecting the second set of resources.

Aspect 13: The method of aspect 1, further comprising: determining that a first payload size of the first uplink control information message is above the bit size threshold; and determining that a second payload size of the second uplink control information message is equal to or below a bit size threshold, wherein selecting the second set of resources comprises reserving the second set of resources for the second uplink control information message based at least in part on the second payload size being equal to or below the bit size threshold.

Aspect 14: The method of aspect 13, wherein reserving the second set of resources comprises: reserving the second set of resources based at least in part on an assumption that the second payload comprises a number of bits equal to the bit size threshold.

Aspect 15: The method of any of aspects 13 through 14, further comprising: selecting the third set of resources, wherein the third set of resources is non-overlapping with the first set of resources and overlapping with the second set of resources.

Aspect 16: The method of any of aspects 13 through 15, wherein selecting the second set of resources comprises: puncturing the physical uplink shared channel with the second uplink control information message, wherein the second uplink control information message occupies a fourth set of resources contained by the second set of resources, and wherein the fourth set of resources is determined based at least in part on an actual payload size of the second uplink control information message.

Aspect 17: The method of any of aspects 13 through 16, further comprising: rate matching the uplink shared channel message around the first set of resources based at least in part on selecting the first set of resources.

Aspect 18: The method of aspect 1, further comprising: determining that a first payload size of the first uplink control information message and a second payload size of the second uplink control information message are each above a bit size threshold.

Aspect 19: The method of aspect 18, further comprising: selecting the third set of resources, wherein the third set of resources is non-overlapping with the first set of resources and the second set of resources.

Aspect 20: The method of any of aspects 18 through 19, further comprising: rate matching the uplink shared channel message around the first set of resources and the second set of resources based at least in part on selecting the first set of resources and the second set of resources.

Aspect 21: The method of any of aspects 1 through 20, further comprising: determining that a CSI transmission overlaps one or more of: the first uplink control information message, the second uplink control information message, or the uplink shared channel message.

Aspect 22: The method of aspect 21, further comprising: determining a quantity of types of uplink control information which overlap the uplink shared channel message exceeds a threshold; and dropping at least a portion of the CSI transmission, a portion of the first uplink control information, or a portion of the second uplink control information message, or any combination thereof, based at least in part on the quantity exceeding the threshold.

Aspect 23: The method of aspect 24, further comprising: receiving, from a base station, an indication of the threshold via DCI, a MAC CE, or RRC signaling.

Aspect 24: The method of aspect 21, further comprising: determining that a first portion of the CSI transmission has a lower priority than the uplink shared channel message; and dropping the first portion of the CSI transmission.

Aspect 25: The method of aspect 24, further comprising: determining a fourth set of resources on the physical uplink shared channel for a second portion of the CSI transmission having a same or higher priority than the uplink shared channel message; and transmitting the second portion of the CSI on the fourth set of resources.

Aspect 26: The method of any of aspects 21 through 25, further comprising: determining a fourth set of resources on the physical uplink shared channel for at least a first portion of the CSI transmission; and transmitting the first portion of the CSI transmission on the fourth set of resources.

Aspect 27: The method of aspect 26, further comprising: rate matching the first portion of the CSI transmission around the first set of resources and the second set of resources.

Aspect 28: The method of any of aspects 26 through 27, further comprising: rate matching the first portion of the CSI transmission around the first set of resources and the second set of resources; and puncturing at least a portion of a fifth set of resources for a second portion of the CSI transmission with one or more of: the first set of resources or the second set of resources.

Aspect 29: The method of any of aspects 1 through 28, wherein one or more of the first uplink control information message or the second uplink control information message comprises acknowledgment feedback.

Aspect 30: A method for wireless communications at a base station, comprising: monitoring a physical uplink shared channel for an uplink shared channel message, a first uplink control information message with a first priority, a second uplink control information message with a second priority from a UE, wherein the first priority is higher than the second priority; identifying a first set of resources on the physical uplink shared channel for the first uplink control information message; identifying a second set of resources on the physical uplink shared channel for the second uplink control information message, wherein the first set of resources is non-overlapping with the second set of resources; and decoding the first uplink control information message on the first set of resources, the second uplink control information message on the second set of resources, and the uplink shared channel message on a third set of resources on the physical uplink shared channel.

Aspect 31: The method of aspect 30, further comprising: determining that a first payload size of the first uplink control information message and a second payload size of the second uplink control information message are each equal to or below a bit size threshold, wherein the first set of resources and the second set of resources are reserved based at least in part on the first payload size and the second payload size being equal to or below the bit size threshold.

Aspect 32: The method of aspect 31, wherein the first set of resources and the second set of resources are reserved based at least in part on an assumption that the first payload and the second payload each comprise a number of bits equal to the bit size threshold.

Aspect 33: The method of any of aspects 31 through 32, further comprising: determining the physical uplink shared channel is punctured by the first uplink control information message on the first set of resources, wherein the first uplink control information message occupies a fourth set of resources contained in the first set of resources; and determining the physical uplink shared channel is punctured by the second uplink control information on the second set of resources, wherein the second uplink control information occupies a fifth set of resources contained in the second set of resources.

Aspect 34: The method of aspect 33, wherein the fourth set of resources is based at least in part on a first actual payload size of the first uplink control information message, and the fifth set of resources is based at least in part on a second actual payload size of the second uplink control information message.

Aspect 35: The method of aspect 30, further comprising: determining that a first payload size of the first uplink control information message is equal to or below a bit size threshold, wherein the first set of resources is reserved for the first uplink control information message based at least in part on the first payload size being equal to or below the bit size threshold; and determining that a second payload size of the second uplink control information message is above the bit size threshold.

Aspect 36: The method of aspect 35, wherein the first set of resources is reserved based at least in part on an assumption that the first payload comprises a number of bits equal to the bit size threshold.

Aspect 37: The method of any of aspects 35 through 36, wherein the third set of resources is non-overlapping with the second set of resources and overlapping with the first set of resources.

Aspect 38: The method of any of aspects 35 through 37, further comprising: determining the physical uplink shared channel is punctured by the first uplink control information message, wherein the first uplink control information message occupies a fourth set of resources contained by the first set of resources based at least in part on an actual payload size of the first uplink control information message.

Aspect 39: The method of any of aspects 35 through 38, wherein the uplink shared channel message is rate matched around the second set of resources.

Aspect 40: The method of aspect 30, further comprising: determining that a first payload size of the first uplink control information message is above the bit size threshold; and determining that a second payload size of the second uplink control information message is equal to or below a bit size threshold wherein the second set of resources are reserved for the second uplink control information message based at least in part on the second payload size being equal to or below the bit size threshold.

Aspect 41: The method of aspect 40, wherein the second set of resources is reserved based at least in part on an assumption that the second payload comprises a number of bits equal to the bit size threshold.

Aspect 42: The method of any of aspects 40 through 41, wherein the third set of resources is non-overlapping with the first set of resources and overlapping with the second set of resources.

Aspect 43: The method of any of aspects 40 through 42, further comprising: determining the physical uplink shared channel is punctured by the second uplink control information message, wherein the second uplink control information message occupies a fourth set of resources contained by the second set of resources based at least in part on an actual payload size of the second uplink control information message.

Aspect 44: The method of any of aspects 40 through 43, wherein the uplink shared channel message is rate matched around the first set of resources.

Aspect 45: The method of aspect 30, further comprising: determining that a first payload size of the first uplink control information message and a second payload size of the second uplink control information message are each above a bit size threshold, wherein the third set of resources is non-overlapping with the first set of resources and the second set of resources.

Aspect 46: The method of aspect 45, wherein the uplink shared channel message is rate matched around the first set of resources and the second set of resources.

Aspect 47: The method of any of aspects 30 through 46, further comprising: determining that a CSI transmission overlaps one or more of: the first uplink control information message, the second uplink control information message, or the uplink shared channel message.

Aspect 48: The method of aspect 47, further comprising: determining a quantity of types of uplink control information which overlap the uplink shared channel message exceeds a threshold; and determining that at least a portion of the CSI transmission, a portion of the first uplink control information, or a portion of the second uplink control information message, or any combination thereof, is dropped by the UE based at least in part on the quantity exceeding the threshold.

Aspect 49: The method of aspect 50, further comprising: transmitting, to the UE, an indication of the threshold via DCI, a MAC CE, or radio resource control signaling.

Aspect 50: The method of aspect 47, further comprising: determining that a first portion of the CSI transmission has a lower priority than the uplink shared channel message, wherein the first portion of the CSI transmission is dropped by the UE.

Aspect 51: The method of aspect 50, further comprising: determining a fourth set of resources on the physical uplink shared channel for a second portion of the CSI transmission having a same or higher priority than the uplink shared channel message; and receiving the second portion of the CSI transmission with the higher priority on the fourth set of resources.

Aspect 52: The method of any of aspects 47 through 51, further comprising: determining a fourth set of resources on the physical uplink shared channel for at least a first portion of the CSI transmission; and receiving the first portion of the CSI transmission on the fourth set of resources.

Aspect 53: The method of aspect 52, wherein the first portion of the CSI transmission is rate matched around the first set of resources and the second set of resources.

Aspect 54: The method of any of aspects 52 through 53, wherein the first portion of the CSI transmission is rate matched around the first set of resources and the second set of resources, and one or more of the first set of resources or the second set of resources puncture at least a portion of a fifth set of resources for a second portion of the CSI transmission Aspect 55: The method of any of aspects 30 through 54, wherein one or more of the first uplink control information message or the second uplink control information message include acknowledgment feedback.

Aspect 56: An apparatus for wireless communications at a UE, comprising at least one processor; memory coupled to the at least one processor; and instructions stored in the memory and executable by the processor to cause the apparatus to perform a method of any of aspects 1 through 29.

Aspect 57: An apparatus for wireless communications at a UE, comprising at least one means for performing a method of any of aspects 1 through 29.

Aspect 58: A non-transitory computer-readable medium storing code for wireless communications at a UE, the code comprising instructions executable by a processor to perform a method of any of aspects 1 through 29.

Aspect 59: An apparatus for wireless communications at a base station, comprising at least one processor; memory coupled to the at least one processor; and instructions stored in the memory and executable by the at least one processor to cause the apparatus to perform a method of any of aspects 30 through 55.

Aspect 60: An apparatus for wireless communications at a base station, comprising at least one means for performing a method of any of aspects 30 through 55.

Aspect 61: A non-transitory computer-readable medium storing code for wireless communications at a base station, the code comprising instructions executable by a processor to perform a method of any of aspects 30 through 55.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    determining an overlap between a first uplink control information message with a first priority, a second uplink control information message with a second priority, a channel state information (CSI) transmission, and an uplink shared channel message, wherein the first priority is higher than the second priority;
    determining a quantity of types of uplink control information which overlap the uplink shared channel message exceeds a threshold;
    dropping at least a portion of the first uplink control information message, a portion of the second uplink control information message, a portion of the CSI transmission, or any combination thereof, based at least in part on the quantity exceeding the threshold;
    selecting a first set of resources on a physical uplink shared channel for the first uplink control information message based at least in part on the first priority;
    selecting a second set of resources on the physical uplink shared channel for the second uplink control information message based at least in part on the second priority, wherein the second set of resources is non-overlapping with the first set of resources; and
    transmitting the first uplink control information message on the first set of resources and the second uplink control information message on the second set of resources on the physical uplink shared channel.

2. The method of claim 1, further comprising:
    receiving, from a network entity, an indication of the threshold via downlink control information, a medium access control element, or radio resource control signaling.

3. The method of claim 1, wherein the threshold is two types of uplink control information or three types of uplink control information.

4. The method of claim 1, wherein the CSI transmission is an aperiodic CSI transmission associated with the physical uplink shared channel, a semi-persistent CSI transmission associated with the physical uplink shared channel, a semi-persistent CSI transmission associated with a physical uplink control channel, or a periodic CSI transmission associated with the physical uplink control channel.

5. The method of claim 1, further comprising:
    determining that a first portion of the CSI transmission has a lower priority than the first uplink control information message and the second uplink control information message; and
    dropping the first portion of the CSI transmission.

6. The method of claim 5, further comprising:
    determining a fourth set of resources on the physical uplink shared channel for a second portion of the CSI transmission having a same or higher priority than the uplink shared channel message; and
    transmitting the second portion of the CSI transmission on the fourth set of resources.

7. The method of claim 1, further comprising:
determining the CSI transmission has a higher priority than the second uplink control information message and a lower priority than the first uplink control information message;
dropping the second uplink control information message; and
transmitting the first uplink control information message on the first set of resources and the CSI transmission on a fourth set of resources.

8. The method of claim 1, further comprising:
determining a fourth set of resources on the physical uplink shared channel for at least a first portion of the CSI transmission; and
transmitting the first portion of the CSI transmission on the fourth set of resources.

9. The method of claim 8, further comprising:
rate matching the first portion of the CSI transmission around the first set of resources and the second set of resources.

10. The method of claim 8, further comprising:
rate matching the first portion of the CSI transmission around the first set of resources and the second set of resources; and
puncturing at least a portion of a fifth set of resources for a second portion of the CSI transmission with one or more of: the first set of resources or the second set of resources.

11. The method of claim 1, further comprising:
determining that a first payload size of the first uplink control information message is equal to or below a bit size threshold, wherein selecting the first set of resources comprises reserving the first set of resources for the first uplink control information message based at least in part on the first payload size being equal to or below the bit size threshold; and
determining that a second payload size of the second uplink control information message is above the bit size threshold.

12. The method of claim 11, wherein reserving the first set of resources comprises:
reserving the first set of resources based at least in part on an assumption that the first payload size comprises a number of bits equal to the bit size threshold.

13. The method of claim 11, further comprising:
selecting a third set of resources for transmitting the uplink shared channel message on the physical uplink shared channel, wherein the third set of resources is non-overlapping with the second set of resources and overlapping with the first set of resources.

14. The method of claim 11, wherein selecting the first set of resources comprises:
puncturing the physical uplink shared channel with the first uplink control information message, wherein the first uplink control information message occupies a fourth set of resources contained by the first set of resources, and wherein the fourth set of resources is determined based at least in part on an actual payload size of the first uplink control information message.

15. The method of claim 11, further comprising:
rate matching the uplink shared channel message around the second set of resources based at least in part on selecting the second set of resources.

16. The method of claim 1, further comprising:
determining that a first payload size of the first uplink control information message and a second payload size of the second uplink control information message are each above a bit size threshold.

17. The method of claim 16, further comprising:
selecting a third set of resources for transmitting the uplink shared channel message on the physical uplink shared channel, wherein the third set of resources is non-overlapping with the first set of resources and the second set of resources.

18. The method of claim 16, further comprising:
rate matching the uplink shared channel message around the first set of resources and the second set of resources based at least in part on selecting the first set of resources and the second set of resources.

19. The method of claim 1, further comprising:
transmitting the uplink shared channel message on a third set of resources on the physical uplink shared channel.

20. A method for wireless communications at a network entity, comprising:
monitoring a physical uplink shared channel for an uplink shared channel message from a user equipment (UE), wherein a channel state information (CSI) transmission, a first uplink control information message with a first priority, and a second uplink control information message with a second priority overlap with the physical uplink shared channel, wherein the first priority is higher than the second priority; and
decoding the first uplink control information message on a first set of resources on the physical uplink shared channel and the second uplink control information message on a second set of resources that is non-overlapping with the first set of resources on the physical uplink shared channel based at least in part on a portion of the CSI transmission, a portion of the first uplink control information message, a portion of the second uplink control information message, or any combination thereof, being dropped by the UE based at least in part on a quantity of types of uplink control information which overlap the uplink shared channel message exceeding a threshold.

21. The method of claim 20, further comprising:
transmitting, to the UE, an indication of the threshold via downlink control information, a medium access control element, or radio resource control signaling.

22. The method of claim 20, further comprising:
determining that a first portion of the CSI transmission has a lower priority than the uplink shared channel message, wherein the first portion of the CSI transmission is dropped by the UE.

23. The method of claim 22, further comprising:
determining a fourth set of resources on the physical uplink shared channel for a second portion of the CSI transmission having a same or higher priority than the uplink shared channel message; and
receiving the second portion of the CSI transmission with the higher priority on the fourth set of resources.

24. The method of claim 20, further comprising:
determining a fourth set of resources on the physical uplink shared channel for at least a first portion of the CSI transmission; and
receiving the first portion of the CSI transmission on the fourth set of resources.

25. An apparatus for wireless communications at a user equipment (UE), comprising:
at least one processor; and
memory coupled to the at least one processor, the memory storing instructions executable by the at least one processor to cause the apparatus to:

determine an overlap between a first uplink control information message with a first priority, a second uplink control information message with a second priority, a channel state information (CSI) transmission and an uplink shared channel message, wherein the first priority is higher than the second priority;

determine a quantity of types of uplink control information which overlap the uplink shared channel message exceeds a threshold;

drop at least a portion of the first uplink control information message, a portion of the second uplink control information message, a portion of the CSI transmission, or any combination thereof, based at least in part on the quantity exceeding the threshold;

select a first set of resources on a physical uplink shared channel for the first uplink control information message based at least in part on the first priority;

select a second set of resources on the physical uplink shared channel for the second uplink control information message based at least in part on the second priority, wherein the second set of resources is non-overlapping with the first set of resources; and transmit the first uplink control information message on the first set of resources and the second uplink control information message on the second set of resources on the physical uplink shared channel.

26. An apparatus for wireless communications at a network entity, comprising:

at least one processor; and memory coupled to the at least one processor, the memory storing instructions executable by the at least one processor to cause the apparatus to:

monitor a physical uplink shared channel for an uplink shared channel message from a user equipment (UE), wherein a channel state information (CSI) transmission, a first uplink control information message with a first priority, and a second uplink control information message with a second priority overlap with the physical uplink shared channel, wherein the first priority is higher than the second priority; and decode the first uplink control information message on a first set of resources on the physical uplink shared channel and the second uplink control information message on a second set of resources that is non-overlapping with the first set of resources on the physical uplink shared channel based at least in part on a portion of the CSI transmission, a portion of the first uplink control information message, a portion of the second uplink control information message, or any combination thereof, being dropped by the UE based at least in part on a quantity of types of uplink control information which overlap the uplink shared channel message exceeding a threshold.

\* \* \* \* \*